United States Patent
Rhodes et al.

(10) Patent No.: US 10,176,448 B1
(45) Date of Patent: Jan. 8, 2019

(54) GENERATION OF DYNAMIC DELIVERY ZONES FOR MERCHANTS

(71) Applicant: Square, Inc., San Francisco, CA (US)

(72) Inventors: Matthew Rhodes, San Francisco, CA (US); Benjamin R. Bernstein, San Francisco, CA (US); Yunjing Xu, Dublin, CA (US)

(73) Assignee: Square, Inc., San Francisco, CA (US)

( * ) Notice: Subject to any disclaimer, the term of this patent is extended or adjusted under 35 U.S.C. 154(b) by 228 days.

(21) Appl. No.: 14/985,267

(22) Filed: Dec. 30, 2015

(51) Int. Cl.
| | |
|---|---|
| *G06Q 20/00* | (2012.01) |
| *G06Q 10/08* | (2012.01) |
| *G06Q 50/12* | (2012.01) |
| *G06Q 30/06* | (2012.01) |
| *G06Q 30/02* | (2012.01) |
| *G01S 19/14* | (2010.01) |

(52) U.S. Cl.
CPC ........ *G06Q 10/08355* (2013.01); *G01S 19/14* (2013.01); *G06Q 10/0838* (2013.01); *G06Q 30/0206* (2013.01); *G06Q 30/0641* (2013.01); *G06Q 50/12* (2013.01)

(58) Field of Classification Search
CPC ..................... G06Q 10/08355; G06Q 30/0206
USPC ...................................................... 705/15, 24
See application file for complete search history.

(56) References Cited

U.S. PATENT DOCUMENTS

| | | | |
|---|---|---|---|
| 6,026,375 A | 2/2000 | Hall et al. | |
| 6,206,750 B1 | 3/2001 | Barad et al. | |
| 8,458,044 B2 | 6/2013 | Blair et al. | |
| 8,504,435 B2 | 8/2013 | Charles | |
| 9,269,103 B1 | 2/2016 | Kumar et al. | |
| 9,466,045 B1 | 10/2016 | Kumar | |
| 9,639,908 B1 | 5/2017 | Reiss et al. | |
| 9,679,489 B2 * | 6/2017 | Lambert | G08G 1/123 |
| 10,043,149 B1 | 8/2018 | Iacono et al. | |
| 2002/0077937 A1 | 6/2002 | Lyons et al. | |

(Continued)

OTHER PUBLICATIONS

Horn, L., "Groupon Now Provides Instant Location-Based Deals," PC Magazine Online, dated May 11, 2011, ProQuest Dialog, Retrieved from the Internet URL: http://search.proquest.com/professional/docview/1092618010?accountid=161862, on Nov. 2, 2015, pp. 1-2.

(Continued)

*Primary Examiner* — Rokib Masud
(74) *Attorney, Agent, or Firm* — Mattingly & Malur, PC

(57) ABSTRACT

In some examples, a service provider may receive revenue value shared between the service provider and a merchant. The service provider may also receive an order request along with item information and a delivery location. Accordingly, the service provider may determine an original delivery boundary and a delivery fee associated with the order request based at least on the delivery location. If the value of revenue shared is more than a predefined value, the service provider allocates at least a part of the value of shared revenue toward modifying the delivery boundary, wherein the modified delivery boundary causes at least one of: (a) an inclusion of the buyer previously excluded from the delivery boundary, or (b) a new delivery fee for delivering the indicated items, where the new delivery fee is computed based on a contribution of the percentage value of the shared revenue toward the original delivery fee.

20 Claims, 14 Drawing Sheets

(56) References Cited

U.S. PATENT DOCUMENTS

| | | | |
|---|---|---|---|
| 2002/0138350 | A1 | 9/2002 | Cogen |
| 2002/0143655 | A1 | 10/2002 | Elston et al. |
| 2002/0178074 | A1 | 11/2002 | Bloom |
| 2006/0206395 | A1 | 9/2006 | Vallabh |
| 2006/0235754 | A1 | 10/2006 | Walker et al. |
| 2006/0293971 | A1 | 12/2006 | Hunter et al. |
| 2007/0185776 | A1 | 8/2007 | Nguyen et al. |
| 2008/0052163 | A1 | 2/2008 | Koh |
| 2008/0275643 | A1 | 11/2008 | Yaqub et al. |
| 2009/0106124 | A1 | 4/2009 | Yang |
| 2009/0187488 | A1* | 7/2009 | Shamilian .............. G06Q 10/02 705/16 |
| 2009/0307096 | A1 | 12/2009 | Antonellis |
| 2010/0076853 | A1 | 3/2010 | Schwarz |
| 2012/0036028 | A1 | 2/2012 | Webb |
| 2012/0197722 | A1 | 8/2012 | Mesaros |
| 2012/0203619 | A1 | 8/2012 | Lutnick et al. |
| 2012/0303425 | A1 | 11/2012 | Katzin et al. |
| 2013/0006747 | A1 | 1/2013 | Wu |
| 2013/0046605 | A1 | 2/2013 | Baron et al. |
| 2013/0054323 | A1 | 2/2013 | Charles |
| 2013/0226651 | A1 | 8/2013 | Napper |
| 2013/0246207 | A1 | 9/2013 | Novak et al. |
| 2013/0290172 | A1 | 10/2013 | Mashinsky |
| 2013/0317940 | A1 | 11/2013 | Fitz |
| 2014/0011522 | A1 | 1/2014 | Lin et al. |
| 2014/0074743 | A1 | 3/2014 | Rademaker |
| 2014/0089135 | A1 | 3/2014 | Linh et al. |
| 2014/0156452 | A1 | 6/2014 | Lupo |
| 2014/0164126 | A1 | 6/2014 | Nicholas et al. |
| 2014/0180959 | A1 | 6/2014 | Gillen et al. |
| 2014/0188637 | A1 | 7/2014 | Balasubramaniam et al. |
| 2014/0188650 | A1 | 7/2014 | Sun et al. |
| 2014/0214465 | A1 | 7/2014 | L'Heureux et al. |
| 2014/0226487 | A1* | 8/2014 | Forssell ................ H04W 36/22 370/235 |
| 2014/0343841 | A1 | 11/2014 | Faaborg et al. |
| 2014/0370167 | A1* | 12/2014 | Garden .................. G06Q 50/12 426/233 |
| 2015/0206093 | A1 | 7/2015 | Trew et al. |
| 2015/0262121 | A1 | 9/2015 | Riel-Dalpe et al. |
| 2015/0304436 | A1 | 10/2015 | Vaccari et al. |
| 2018/0022405 | A1 | 1/2018 | Gecchelin et al. |

OTHER PUBLICATIONS

Kauffman, R.J., and Wang, B., "Bid Together, Buy Together: On the Efficacy of Group-Buying Business Models in Internet-Based Selling," Carlson School of Management, last revised on May 16, 2001, pp. 1-44.
Non-Final Office Action dated May 26, 2015, for U.S. Appl. No. 14/625,680, of Kumar, A.R., et al., filed Feb. 19, 2015.
Notice of Allowance dated Nov. 6, 2015, for U.S. Appl. No. 14/625,680, of Kumar, A.R., et al., filed Feb. 19, 2015.
Notice of Allowance dated Dec. 22, 2016, for U.S. Appl. No. 14/663,671, of Reiss, J.L., et al., filed Mar. 20, 2015.
Non-Final Office Action dated Jun. 24, 2015, in U.S. Appl. No. 14/663,671, of Reiss J. L., et al., filed Mar. 20, 2015.
Final Office Action dated Dec. 24, 2015, in U.S. Appl. No. 14/663,671, of Reiss J. L., et al., filed Mar. 20, 2015.
Advisory Action dated Mar. 9, 2016, in U.S. Appl. No. 14/663,671, of Reiss, J. L., et al., filed Mar. 20, 2015.
Non-Final Office Action dated Oct. 6, 2016, for U.S. Appl. No. 14/663,671, of Reiss, J.L., et al., filed Mar. 20, 2015.
Non-Final Office Action dated Nov. 9, 2017, for U.S. Appl. No. 14/625,673, of Reiss, J.L., et al., filed Feb. 19, 2015.
Notice of Allowance dated Apr. 6, 2018, for U.S. Appl. No. 14/870,886, of Iacono, J.F., et al., filed Sep. 30, 2015.
Non-Final Office Action dated May 18, 2018, for U.S. Appl. No. 14/978,307, of Kumar, A.R., et al., filed Dec. 22, 2015.
Non-Final Office Action dated Feb. 1, 2018, for U.S. Appl. No. 14/993,149, of Kohli, A., et al., filed Jan. 12, 2016.
Non-Final Office Action dated Feb. 28, 2018, for U.S. Appl. No. 14/642,875, of Reiss, J.L., et al., filed Mar. 10, 2015.
Non-Final Office Action dated Mar. 8, 2018, for U.S. Appl. No. 14/663,678, of Reiss, J.L., et al., filed Mar. 20, 2015.
Non-Final Office Action dated Jan. 11, 2018, for U.S. Appl. No. 14/625,663, of Kumar, A.R., et al., filed Feb. 19, 2015.
Non-Final Office Action dated Jan. 12, 2018, for U.S. Appl. No. 14/813,358, of Kohli, A., filed Jul. 30, 2015.
Non-Final Office Action dated Jan. 26, 2018, for U.S. Appl. No. 14/838,446, of Kohli, A., filed Aug. 28, 2015.
Final Office Action dated Aug. 28, 2018, for U.S. Appl. No. 14/642,875, of Reiss, J.L., et al., filed Mar. 10, 2015.
Final Office Action dated Sep. 7, 2018, for U.S. Appl. No. 14/625,683, of Kumar, A.R., et al., filed Feb. 19, 2015.
Final Office Action dated Sep. 21, 2018, for U.S. Appl. No. 14/838,446, of Kohli, A., filed Aug. 28, 2015.

* cited by examiner

GENERATION OF DYNAMIC DELIVERY ZONES FOR MERCHANTS

BACKGROUND

People enjoy eating quality food that is prepared by good restaurants. Nevertheless, sometimes people may not want to go to a restaurant, but instead may prefer to have food delivered to them. To meet this demand, a courier may deliver food prepared by a restaurant to a customer at a delivery location. For example, a service may enable customers to order food items from any of a variety of restaurants, and may arrange for couriers to deliver the food items from the restaurants to the customers. If it is too expensive for the courier to deliver the food from the restaurant to the customer, for example a distant customer, a restaurant with a delivery service establishes a fixed delivery zone and does not deliver to customers located outside of this fixed zone. In some cases, the service charges an incremental delivery fee to cater to the customers outside of the fixed zone. High delivery fees can discourage the customer from using the service and can prevent the merchant from expanding the business beyond the fixed zone.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

Figure 1:
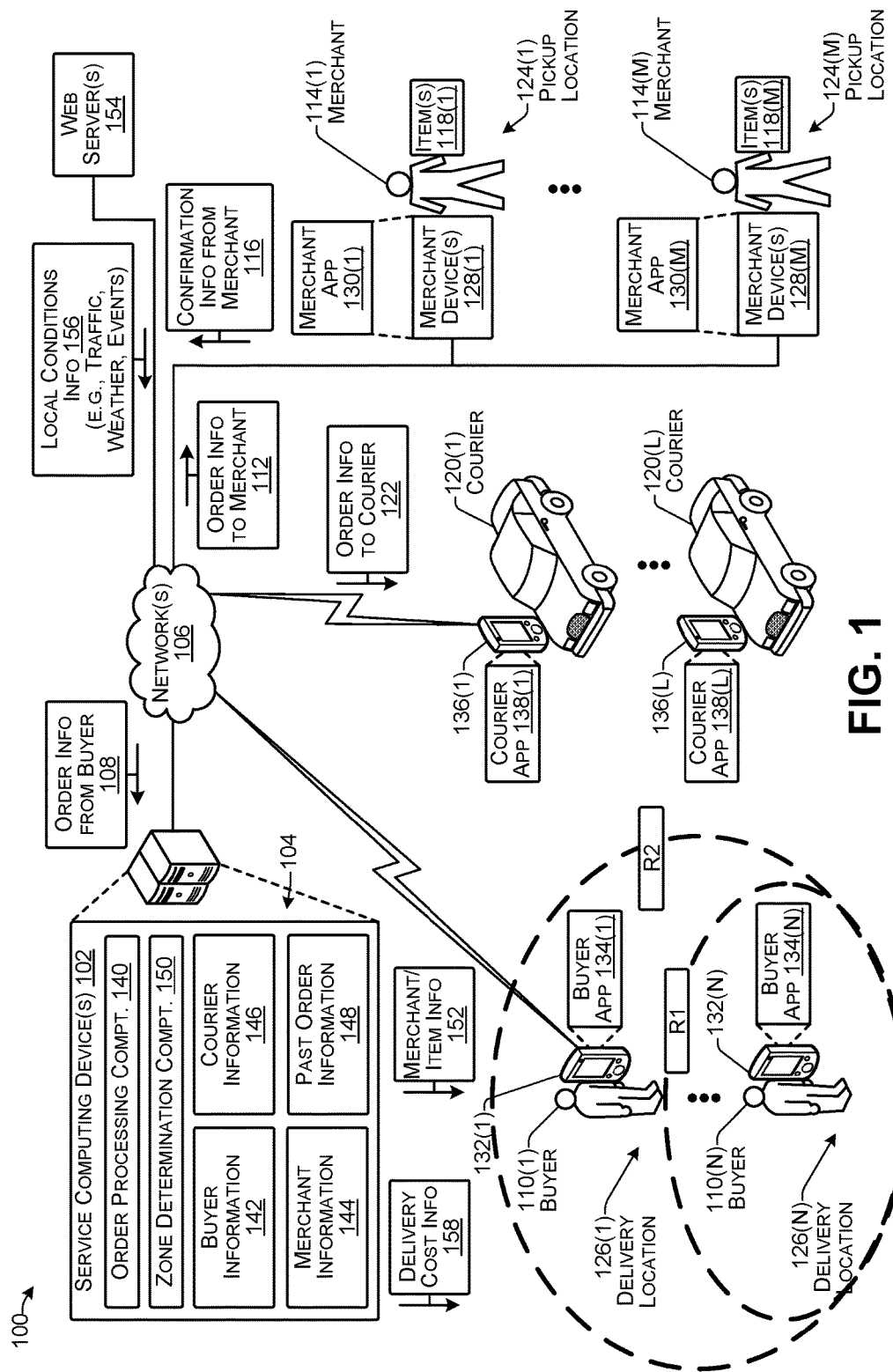
FIG. 1 is a network diagram of an exemplary environment configured to generate dynamic delivery zones, according to some implementations.

The embodiments disclosed herein describe a novel system and environment to facilitate merchants, who want to accept orders for delivery from buyers, especially those buyers who are otherwise constrained to ordering from a set of merchants due to their distance from other merchants or other variations in local conditions, for example traffic conditions or spoilage time associated with items, etc.

For instance, according to an embodiment, a buyer who is placing an order may be presented with the opportunity to order from selected merchants and/or order selected items from the selected merchants irrespective of the delivery location associated with the buyer, a pick-up location associated with the merchant, and/or predicted courier travel time between the delivery location and the selected merchants. In some cases, the delivery location of the buyer and merchant may be determined by a Global Positioning System (GPS) receiver or other location sensor onboard a buyer device and a merchant device respectively, and this location information may be transmitted to a service computing device as the indicated delivery location. Conventionally, the buyer uses a delivery service to order from merchants situated within a delivery zone—the zone being determined based on the distance of the buyer from the merchants. Alternatively or additionally, the services tie delivery zones to delivery fees. In other words, the further away the buyer is from the merchant, higher the delivery fee. In some cases, these zones are generally fixed and are symmetrically distant from the merchant's location, which means any expansion or reduction in delivery zone causes the delivery fee to vary for all merchants within the delivery zone.

The technology herein employs a plurality of computing devices, mobile devices, and location sensors to provide a novel technological arrangement that creates flexible delivery zones or delivery boundaries for the merchant based at least in part on factors such as shared-revenue, delivery location and local conditions, such as traffic, weather, local events, and the like, thereby providing buyers with a greater choice of merchants' locations for ordering items, where flexibility translates into relaxed delivery fees.

Additionally, some implementations herein provide technological innovations that encourage people to participate as couriers in a new type of crowdsourced service economy. With the technology herein, essentially any person with a mobile device is able to immediately become a courier, or cease to be a courier, in a courier network that provides delivery services for delivery of items from merchants to buyers. Furthermore, since some implementations herein distribute a measured portion of the revenue shared between merchants and courier service towards expanding merchant reach and business, the implementations encourage the merchants to set higher revenue shares between the merchants and the courier service, making it advantageous for all parties involved. Additionally, through the interaction of the plurality of computing devices, mobile devices, and location sensors, implementations herein are able to track the movement of couriers throughout a service region over time, and can use this information to assist in expanding or contracting the delivery boundaries in real-time.

Furthermore, some examples described herein include techniques and arrangements for employing dynamic or fluid delivery zones with delivery orders based at least in part on shared-revenue, buyer density, demand-supply of items, regional conditions, buyer delivery location, merchant pickup location, and the like. For instance, a service provider may provide a delivery service that enables buyers to order items, such as food items or other goods from merchants, such as restaurants. When placing an order with a merchant, the buyer may use a buyer application on a buyer device, such as a mobile device or other computing device, to browse through the items available from various different merchants. The buyer application may also indicate to the buyer an estimate of the delivery fee associated with the order. The delivery fee may be based on, for example, the distance between the merchant and the buyer's delivery location and the shared-revenue. So, if the buyer location is beyond a certain distance, the service applies a part of the shared revenue towards subsidizing the delivery fee. If the buyer agrees with the delivery and/or service charges, the buyer may select a particular item to order from a particular merchant and the service may send information about this selection to the particular merchant. Further, the service may arrange for a courier to pick up the ordered item from the merchant and deliver the item to the buyer at the reduced delivery fee.

In some examples herein, at least one respective delivery zone may be determined for each merchant, such as based in part on shared-revenue between the merchant and the service. Further, respective delivery zones may also be determined for individual items offered by each merchant and/or categories of items offered by each merchant, such that each merchant may have multiple different delivery zones for different items offered by the that merchant. Accordingly, a delivery zone may be determined as a geographic area in which an item can be delivered to a delivery location of the buyer at a reduced delivery fee. A reduced delivery fee may be the costs associated with delivering an ordered item to the buyer lower than what would be expected normally by the buyer. Further, revenue sharing may refer to an equal or unequal distribution of profits and/or losses between stakeholders such as the courier service and the merchants, who could be general partners (and limited partners in a limited partnership), a company's employees, or between companies in a business alliance. The shared-revenue may be based on per item, a category of items, the gross product value of the merchant's business, growth percentages, and other such determinants.

The delivery zone of a particular merchant may expand and contract with changes in shared-revenue parameters, traffic conditions, weather, and/or other local conditions. For example, a particular merchant may have a very large delivery zone due to a higher revenue sharing arrangement with the courier service. However, another merchant in the neighborhood of the first merchant may have a delivery zone dramatically smaller, due to a lower revenue sharing arrangement. Additionally, in some examples, the delivery zone of a particular merchant may be defined, and may change, on a per-item basis and/or a per-item-category basis. For example, some categories of items, such as food prepared by the restaurants may have a higher revenue sharing percentage and can typically be delivered much farther at a given courier speed than other categories of items, such as soda or off-the-shelf items, that the restaurant does not prepare and/or with which the restaurant has a lower or zero revenue sharing arrangement.

Furthermore, based on the fluid delivery zones for particular merchants and/or particular items or item categories, a buyer application on a buyer device may present the buyer with different menus for particular merchants depending on the estimated delivery fee from each merchant to the delivery location of the buyer. For instance, as the individual delivery zones of the merchants expand and contract based on revenue sharing or other local conditions, the buyer may be presented with an expanding and contracting selection of merchants from whom the buyer may order. In some cases, the selection is static as the revenue sharing does not change in real-time, however, in some cases, the merchants may have a fluid revenue sharing relationship with the courier service, and as such, the delivery fee may change in real-time as the revenue sharing changes. Additionally, the menu of items offered by each merchant may change depending on the other factors, such as distance, buyer density, or even spoilage times of the individual items presented in the menu associated with each merchant. As one example, if a buyer is not currently able to order a particular item for immediate delivery, the buyer application may provide an option for the buyer to place the order now and have the order arrive in several hours after the delivery fee reaches a certain value. Meanwhile, the merchant may reduce the delivery fee by increasing revenue sharing after seeing an increased demand or interest in a certain food item or restaurant location. Furthermore, predicted interest in an item may be determined based on demand and supply information received from particular merchants and/or empirical information gathered from deliveries made over a past period of time, as well as current or predicted events, such as pre-game parties, and so forth. Thus, the revenue sharing may increase around certain game events and thus the delivery fee may automatically adjust itself in accordance with the revenue sharing percentages.

In some cases, each delivery zone may be determined based on a radius, oval, or other suitable shape around a pickup location of a respective merchant. In other examples however, each delivery zone may be determined more precisely as a respective polygon or partial polygon around each pickup location, such as with the outer perimeter of the polygon being aligned with individual streets at the edges of the respective delivery zone. In yet other examples, the delivery zone may vary from merchant to merchant and thus the delivery zone may be a fluid boundary, not subscribing to a definite shape.

In some examples, delivery fee for an order originating from a particular merchant location to potential delivery locations may be determined based on map information and current or predicted traffic conditions, as well as weather conditions, local events or street closures, local construction, tolls, geological features, and so forth.

In addition, in some cases, the delivery zones may be based at least in part on a cost function that takes into account revenue sharing, weather conditions, traffic conditions, tolls, actual spoilage, and predicted travel time, and which may determine the boundary of the delivery zone at a point at which the cost becomes prohibitive. For instance, a particular delivery zone may be determined based on a certain percentage of revenue sharing, e.g., at any point in time only 10% of the revenue is set towards adjusting the delivery fee from a regular fee, if the adjusted delivery fee is lower a threshold level, then the location may be included in the delivery zone for that item. However, if adjusted delivery fee is still higher than an acceptable level, the zone is not expanded or expanded only up to the point the revenue sharing percentage permits. This determination can be refined based on feedback from the buyers or the couriers, e.g., whether the adjusted delivery fee does not offset the "real" cost of delivery, for example due to loss of orders due to the couriers being too far away for a certain order, or whether an item for a delivered order had to be refunded or switched out for another item with a longer spoilage time, etc. Furthermore, the cost function may treat a toll as another cost of the order, which would tend to make deliveries requiring payment of a toll less likely, as the cost of the toll increases relative to the cost of the order. Additionally, or alternatively, tolls or geological features, such as bodies of water without nearby bridges, may be taken into consideration, and may result in hard cutoffs that might exclude delivery across toll bridges, over toll roads, and/or over geological features that might not be easily traversed.

In some examples, the service provider may receive, from a courier device, a first indication of the time at which the courier picks up the order at the pickup location, and a second indication of a time at which the courier delivers the order to the delivery location. The service may adjust the delivery zones and/or the technique for determining the delivery zones based on the feedback received from the courier devices over a period of time, i.e., based on the difference between predicted courier travel times and actual courier travel times. Further, as mentioned above, the courier fleet may serve as sensors to determine current traffic conditions in the local region, in addition to providing information that may be used to predict courier travel times based on a local conditions during past deliveries as compared with current conditions during a current delivery. Furthermore, the revenue sharing may be adjusted to increase or decrease the contribution of revenue shared in accordance with actual delivery costs.

Additionally, in some examples, the merchants may be arranged in an order determined based at least in part on the delivery fee for delivering food to the delivery location of the buyer from the pickup locations of the various merchants in the service region—the delivery fee dependent on a portion of the revenue sharing percentage, and further based on real-time conditions. For example, when a buyer indicates a desired delivery location and a desired (or default) delivery time interval, the service computing device may determine the delivery fee adjusted as per the revenue sharing percentages. The service computing device may also determine the actual delivery cost in accordance with tolls and the travel time from each merchant pickup location in the service region to the desired delivery location of the buyer for the delivery time interval, such as based on current traffic conditions and other local conditions. The service computing device may then compute a final delivery fee based on both the revenue sharing model and real-time conditions such that the delivery fee does not eat into the profit percentage. The service computing device (or the buyer application) may then arrange merchants in the order of final delivery fee, and may determine menu information to present to the buyer based on these items. The menu information may be presented by the buyer application on the buyer device. If the buyer changes the delivery location, e.g., to a different delivery location in another part of the city, the menu information presented to the buyer may change to other items and/or other merchants based on the estimated delivery fees between the new delivery location and the respective merchant pickup locations.

In some examples, the courier service may rely at least in part on historic data to determine the dynamic delivery zones. Thus, the service may determine, for a plurality of merchants with same or similar revenue sharing model offering same or similar items over a past period of time, e.g., a past month, past two months, past year, etc., the delivery fee without taking a portion of the revenue share, the adjusted delivery fee based on a contribution received from the revenue share, and the actual cost of delivery to the courier based on tolls, traffic conditions, type of item, etc. Thus, at a current time, the service may indicate to the buyer merchants available in the delivery zone of the buyer, or merchants available in several delivery zones of the buyer. The service then receives a communication from a buyer application on a buyer device that includes an indication of a delivery location and an indication of a desired delivery fee and/or a delivery time interval and day for an order that the buyer would like to place. Based on these inputs, the service may send, to the buyer application on the buyer device, a list of merchants within the delivery zone of the buyer having delivery fee lower than the desired delivery fee and/or able to deliver items within the desired delivery time interval.

In some cases, the determination of respective delivery zones may be performed on the buyer device/merchant device, rather than on a service computing device of the service provider. For example, the buyer application on the buyer device may keep track of the location of the buyer device using an onboard GPS receiver or other location sensor. The buyer application may periodically update the item delivery zones and/or merchant delivery zones based on received information, such as traffic information, weather information and local event information.

Thus, methods and systems bias the delivery or tier boundary surrounding a given buyer outward toward merchants that have a higher rev-share percentage with the service provider. What this accomplishes is a transfer of a portion of the greater shared revenue directly from those merchants towards the given buyer's defrayed delivery cost. The resulting tier boundary describes an efficient frontier of sorts that directly aligns pricing with cost structure.

As used herein, an order may include a request submitted by a buyer (e.g., a customer) for the acquisition of food items and/or other goods (referred to herein as items) from a merchant. The order information may be received by the service and sent to the merchant. For example, a merchant may include a restaurant or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases items from a merchant. Buyers may be customers or potential customers of a particular merchant. The service may receive payment from a buyer for an order and the service may provide payment to the merchant for the order. Further, the service may provide payment to the courier for delivering the order. The service and the merchants have a revenue sharing arrangement, which means a part of the profits or sales from an order are shared with or withheld by the service.

For discussion purposes, some example implementations are described in the environment of enabling buyers to place orders with merchants for delivery, such as to provide fluid delivery zones based on varying local conditions. However, implementations herein are not limited to the particular examples provided, and may be extended to other service environments, other system architectures, other types of goods, other conditions, and so forth, as will be apparent to those of skill in the art in light of the disclosure herein.

FIG. 1 illustrates an example environment 100 enabling dynamic or fluid delivery zones according to some implementations. The environment 100 includes one or more service computing devices 102 of a service provider 104 that may receive, over one or more networks 106, order information 108 from a plurality of buyers 110(1)-110(N). The order information 108 may include information about at least one order placed by at least one of the buyers 110, along with a buyer authorized delivery fee based at least on a percentage of shared revenue between a merchant 114 and the service provider 104 controlling the service computing device 102. The delivery fee, in one implementation, is independent of the location of the merchant 114 or merchant device 128 and may vary from one merchant to another situated in the same geographical region. Based on the order information 108 (along with delivery fee) received from a particular buyer 110, the service computing device 102 may send order information 112 to a particular merchant 114 of a plurality of merchants 114(1)-114(M). The particular merchant 114 may receive the order information 112, and may respond with confirmation information 116 to confirm that the particular order has been received and will be prepared by the particular merchant 114.

In some examples, the order information 112 sent to the merchant 114 may identify items 118 ordered by the buyers 110 from the particular merchant 114. For instance, each merchant 114(1)-114(M) may offer one or more respective items 118(1)-118(M), which may be ordered by buyers 110 for delivery. In one implementation, based on a previously established financial relationship between the merchant 114 and the service provider 104, the service computing device 102 extracts a portion of the revenue shared between the merchant 114 and the service provider 104 to defray the delivery fee for the buyer 110. To this end, the service computing device 102 selects the original delivery fee and applies a portion of the revenue shared towards the original fee to yield an adjusted delivery fee, and displays the adjusted delivery fee to the buyer 110 on a buyer app 134. The buyer 110 authorizes the adjusted delivery fee (instead of the higher original delivery fee), which is incorporated in the order information 112.

Even though the merchants 114 may geographically be in the same geographical zone, the merchants 114 may be associated with different delivery fees and as such may be in different delivery zones separated by fluid delivery boundaries as per the revenue shared percentages. As shown as an example, the merchant 114(1) may be in delivery zone 1 that includes all buyers 110 and the merchant 114(M) may be in delivery zone 2 that includes only buyers 110-1, where merchant 114(1) has a 50% shared revenue relationship with the service provider 104, and the merchant 114(2) has a 25% shared revenue relationship with the service provider 104. The higher shared revenue relationship allows the merchant to have a wider delivery zone.

In some cases, the order information 112 may also specify a time at which the order is to be picked up by a courier 120 of a plurality of couriers 120(1)-120(L). For instance, the confirmation information 116 sent by the merchant 114 to the service computing device 102 may confirm the pickup time specified by the service computing device 102. In other cases, the order information 112 sent to the merchant 114 may include an inquiry as to when the order will be ready, and the merchant 114 may include with the confirmation information 116 a specified time at which the order will be ready for pickup.

In either event, in response to receiving the confirmation information 116 from the particular merchant 114, the service computing device 102 may send order information 122 to a particular courier 120 who will pick up the order from the particular merchant 114 and deliver the order to the buyer 110 who placed the order at the adjusted delivery fee based on determined dynamic delivery zones. For instance, each merchant 114(1)-114(M) may be associated with a respective pickup location 124(1)-124(M), which may typically be the merchant's place of business. Furthermore, each buyer 110(1)-110(N) may be associated with a respective delivery location 126(1)-126(N) to which the order is to be delivered.

The order information 122 sent to the courier 120 may include the pickup location 124 for the order, the pickup time, and the delivery location 126 for the order. In some examples, the order information 122 may further include a contract time, i.e., a delivery time by which the service provider 104 has agreed to have the ordered item(s) 118 delivered to the buyer 110 at the delivery location 126. Further, in some cases, the order information 122 may include an amount that the courier 120 will be paid if the courier 120 accepts the delivery job, and/or other information related to the order. This amount may be a component of the adjusted delivery fee. In some cases, the order information 122 may include a route based at least on the adjusted delivery fee.

In the illustrated example, the service computing device 102 of the service provider 104 is able to communicate with merchant devices 128(1)-128(M) over the one or more networks 106. Each merchant device 128(1)-128(M) may be associated with a respective merchant 114(1)-114(M). Each merchant device 128(1)-128(M) may be a computing device, such as a desktop, laptop, tablet, smart phone, or the like, and may include a respective instance of a merchant application 130(1)-130(M) that executes on the respective merchant device 128(1)-128(M). For example, the merchant application 130 may be configured to communicate with the service computing device 102, such as for receiving the order information 112 and for sending the confirmation information 116. In some examples, the merchant application 130 and the service computing device 102 may communicate with each other via one or more application programming interfaces (APIs). Further, the merchant device 128 may include one or more output devices, such as speakers (not shown in FIG. 1), that the merchant application 130 may use to audibly notify the respective merchant 114 that an order has been received. Additionally, or alternatively, the merchant device 128 may include a display (not shown in FIG. 1) that the merchant application 130 may use for presenting the order information 112 to the merchant 114. For instance, the merchant application 130 on the merchant device 128 may present the order information 112 in one or more graphic user interfaces (GUIs).

In some examples, the merchant application 130 may provide point-of-sale (POS) functionality to the merchant device 128 to enable the merchant 114 to accept payments using the merchant device 128. Alternatively, in some examples, the merchant device 128 may be a fax machine and the merchant 114 may receive the order information 112 via a facsimile transmission from the service computing device 102. As still another example, the merchant device 128 may be a computing device that is configured to receive order information via email, instant messaging, or other electronic communication. As still another example, the merchant device 128 may include a phone, and the merchant device 128 may receive the order information 112 via an SMS text message, voicemail, telephone call, or the like.

In addition, the buyers 110(1)-110(N) may be associated with respective buyer devices 132(1)-132(N) that may execute respective instances of buyer applications 134(1)-134(N). For example, buyers 110 may use buyer devices 132, such as smart phones, tablet computers, wearable computing devices, laptops, desktops, or the like, and these buyer devices 132 may have installed thereon the buyer application 134. The buyer application 134 may enable the buyer 110 to select one or more of the items 118 to purchase from one or more of the merchants 114 to be delivered to the buyer 110 by one or more of the couriers 120. For example, the buyer application 134 may present one or more GUIs on a display for enabling the buyer 110 to select one or more of the items 118 for an order.

Further, the buyer application 134 may enable the buyer 110 to place an order from a merchant 114 in advance, such as for scheduling an order for delivery at a later time on the same day, at a specified time on a future day, or the like. For instance, the buyer 110 may be able to place an order through the buyer application 134 to have lunch delivered at a specified delivery location by a specified time on a specified day. The buyer application 134 may further enable the buyer 110 to make a payment for an order using the buyer application 134. For instance, the service provider 104 may charge a buyer account associated with the buyer 110 for an amount associated with a particular order. In some examples, the buyer application 134 and the service computing device 102 may communicate with each other via one or more APIs. Additionally, or alternatively, the buyer application 134 may be a web browser, or the like, and the buyer 110 may navigate to a website associated with the service provider 104, and may use the website associated with the service provider 104 to place an order. Thus, in this case, the website may provide at least some of the functionality attributed to the buyer application herein.

In addition, the couriers 120(1)-120(L) may be associated with respective courier devices 136(1)-136(L) that may execute respective instances of courier applications 138(1)-138(L). For example, couriers 120 may use courier devices 136, such as smart phones, tablet computers, wearable computing devices, laptops, or the like, and these courier devices 136 may have installed thereon the courier application 138. The courier application 138 may be configured to receive the order information 122 from the service computing device 102 to provide a particular courier 120 with information for picking up a particular order from a merchant's pickup location 124 and for delivering the order to a buyer delivery location 126. The courier application 138 may further enable the courier 120 to respond to the service computing device 102 to confirm acceptance of a delivery job.

Additionally, in some cases, the courier application 138 may provide the service computing device 102 with an indication of a current location of a particular courier 120. For instance, one or more location sensors associated with each courier device 136 of an active courier 120 may provide location information and, based on this, the courier application 138 may send location information to the service computing device 102, such as by providing an indication of a geographic location of each courier device of each active courier. Thus, a subset of courier devices 136 associated with active couriers may communicate with the service computing device 102, and may send location information obtained from one or more location sensors associated with each courier device 136, such as a GPS receiver (not shown in FIG. 1). In some cases, another subset of courier devices 136 associated with the inactive couriers may be periodically pinged by the service computing device 102 to determine interest in becoming active and, if so, requesting current location information of the associated inactive courier. Couriers who are interested in being activated may allow their courier devices 136 to respond with their location information, while those who are not interested in being activated may keep their location information private by not responding. In some examples, the courier application 138 and the service computing device 102 may communicate with each other via one or more APIs. Alternatively, in other examples, the courier device 136 may receive the order information 122 via an SMS text message, a voicemail, a telephone call, or the like.

The one or more networks 106 can include any appropriate network, including a wide area network, such as the Internet; a local area network, such an intranet; a wireless network, such as a cellular network, a local wireless network, such as Wi-Fi and/or close-range wireless communications, such as BLUETOOTH® and BLUETOOTH® low energy; a wired network, including fiber optics and Ethernet; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device 102, the merchant devices 128, the buyer devices 132, and/or the courier devices 136 are able to communicate over the one or more networks 106 using wired or wireless connections, and combinations thereof.

In the illustrated example, the service computing device 102 includes an order processing component 140 that may be executed on the service computing device 102 to provide, at least in part, the order processing functionality attributed to the service computing device 102. The order processing component 140 may receive the order information 108 from the buyers 110 and may associate the order information 108 with buyer information 142 and merchant information 144. For instance, based on buyer identifying information that may be included with the order information 108, the order processing component 140 may associate particular order information 108 with a particular buyer account. The order processing component 140 may access a buyer account included in the buyer information 142 to charge for the items ordered, delivery and service, to a particular buyer account for a particular order.

Furthermore, based on a particular merchant 114 identified by the order information 108, the order processing component 140 may associate the order information 108 with a merchant account of a particular merchant. The order processing component 140 may access the merchant account to determine contact information for sending the order information 112 to the correct merchant device 128 so that the particular merchant can receive and provide confirmation of the order. The order processing component 140 may further access the merchant account of the particular merchant to credit payment to the particular merchant that prepares the order.

In addition, the order processing component 140 may access courier information 146 to determine courier contact information for sending the order information 122 to a particular courier 120 of the plurality of couriers 120(1)-120(L) to determine whether the particular courier 120 is willing to accept the delivery job of delivering the order to the buyer. The particular courier 120 may use the courier application 138 on the courier device 136 to receive a message with information about the order, and to respond with acceptance of the delivery job if the job assignment is accepted. The particular courier 120 may subsequently pick up the order from the particular merchant 114 and deliver the order to the particular buyer 110 at a specified delivery location 126. When the courier 120 has completed delivery of the order to the delivery location 126, the courier 120 may use the courier application 138 to inform the order processing component 140 that the delivery has been completed. The order processing component 140 may access a courier account included in courier information 146 for the particular courier 120 to credit the courier account of the particular courier 120 with payment for the delivery job.

The order processing component 140 may store information associated with each order as past order information 148. For instance the past order information 148 may include the delivery fee charged corresponding to each order placed with the merchant, or merchants in the same geographical zone, and a history of revenue share percentages. The past order information 148 may also include a day of the week, date, and time of day at which each order is received from the respective buyer 110. The past order information 148 may further include, for each order: merchant identifying information; buyer identifying information; items ordered; the pickup location 124; the delivery location 126; preparation time for the order; location of the courier when the courier accepted the job for delivery of the order; predicted delivery time for one or more items; predicted and actual delivery time for each of the merchants in the same delivery zone; time that the order was picked up by the courier; time that the order was delivered; amount paid for the order; feedback including records of any complaints or indications of late delivery; as well as other information, as discussed additionally below.

The service computing device 102 may further include a zone determination component 150 that may be executed by the service computing device 102 to determine delivery zones for each merchant and/or items offered by the merchants based at least in part on a value of shared revenue between that merchant and the service 102, and an estimated travel time between the respective merchant pickup locations and the delivery location, and conditions within the service region. For example, when placing an order for an item 118 from a particular merchant 114, the buyer 110 may use the buyer application 134 to place the order. The buyer application 134 may present a GUI on the buyer device 132 that enables the buyer 110 to browse through the items available from various different merchants. Prior to presenting the merchant information in the GUI, the buyer application 134 may receive, from the service computing device 102, merchant/item information 152 for the various merchants from which the buyer is able to select, including information about various items offered by the merchants from which the buyer is able to select. For example, when the buyer opens or otherwise accesses the buyer application 134, the buyer application 134 may initially request that the buyer indicate the desired delivery location 126, as well as provide an indication of a delivery time interval and the day on which delivery is desired. The buyer application 134 may send this information to the service computing device 102. In some cases, the delivery location 126 may be the current location of the buyer device 132, which may be determined by one or more location sensors, such as a GPS receiver onboard the buyer device 132. In other cases, the buyer 110 may enter an address as the delivery location, may proceed with a default address, may select a previously used address, or the like. Further, as discussed additionally below, the buyer application 134 may, by default, assume that the buyer is interested in ordering now for immediate delivery, i.e., as soon as the order can be prepared and delivered. Thus, if the buyer is ordering for immediate delivery, the zone determination component 150 may determine a delivery time interval based at least in part on the time at which the communication of the delivery location is received from buyer device. For instance, the delivery time interval may be a window of time during which delivery of the order is expected to take place, e.g., a window of time from 30-60 minutes after the order is placed, or any other suitable time window. If the buyer prefers a later delivery time or date, the buyer may select one or more options in the GUI to select a later time or day, and this time information may be send to the service computing device 102 with the delivery location information.

Based at least in part on the received delivery location and the determined delivery time interval, the zone determination component 150 may determine which respective delivery zones of which individual merchants encompass the delivery location of the buyer 110 for the delivery time interval, and in some examples, may further determine delivery zones for respective categories of items offered by each merchant and/or individual items offered by each merchant. As discussed below with respect to FIG. 2, the zone determination component 150 may determine the delivery zones based on a number of considerations. For instance, the zone determination component 150 may take into consideration the past order information 148 and various other factors, such as traffic, weather, local events, date, etc. As one example, the zone determination component 150 may access one or more web servers 154 or other databases over a network, or other sources of information, to obtain local conditions information 156, such as traffic, weather, local events, road closures, construction, and the like, for a current or future day. As another example, current traffic conditions may be determined based in part on information received from the courier devices, such as by tracking movement of the courier devices within the service region over time through location information received from the GPS receiver onboard each courier device, or the like. For instance, the courier device may be programmed to periodically report a current location to the service computing device.

Based at least in part on these considerations, the zone determination component 150 may predict estimated courier travel times between pickup locations of various merchants and the delivery location of the buyer. Further, the merchant/item information 152 sent to the buyer device may include information about merchants and items available for not only the soonest available delivery time interval, but also during other delivery time intervals on the same day and/or other days, to provide additional selection options to the buyer 110 when selecting items 118 for delivery. The service computing device 102 also sends to the buyer device information related to the delivery costs 158. The delivery cost information 158 is the adjusted delivery fee for the buyers who were previously excluded from the delivery zone but are now included based on the shared-revenue data. The buyer 110 may select a particular item 118 to order from a particular merchant 114 and the service computing device 102 may send information about this selection to the particular merchant 114. Further, the service may arrange for a courier 120 to pick up the ordered item from the merchant 114 and deliver the item to the buyer 110.

Figure 2:
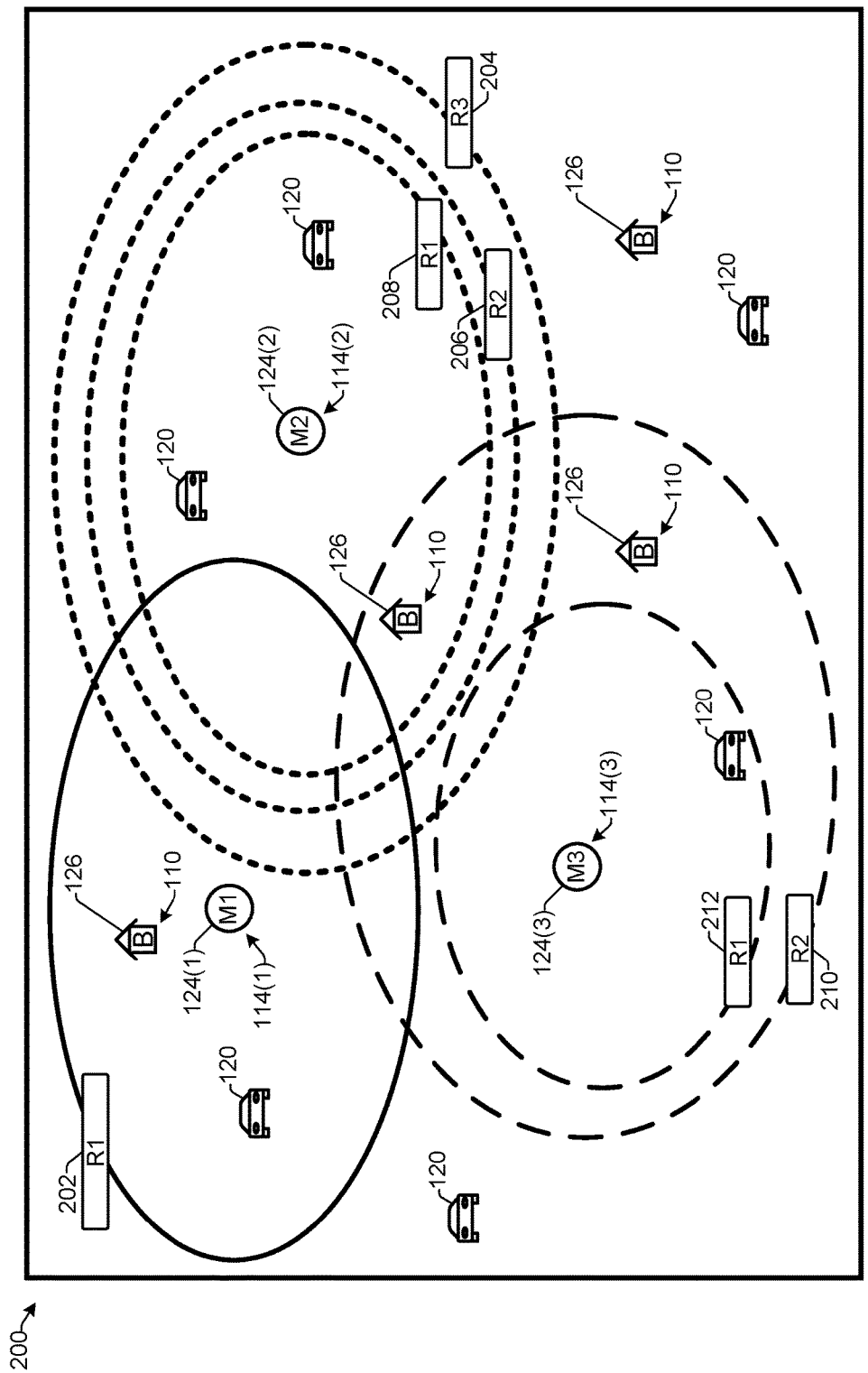
FIG. 2 illustrates example delivery zones excluding certain buyers according to some implementations.

FIG. 2 is a picture illustration of exemplary fluid delivery zones for various merchants, according to a first embodiment of the present subject matter. In the illustrated example, suppose that a rectangle 200 represents at least a portion of a service region. For instance, a service region may be an overall area encompassing a plurality of merchant delivery zones. Within this portion of the service region reside three respective merchant pickup locations 124 associated with three different merchants 114, namely, a first merchant pickup location 124(1) associated with a first merchant 114(1); a second merchant pickup location 124(2) associated with a second merchant 114(2); and a third merchant pickup location 124(3) associated with a third merchant 114(3).

Additionally, suppose each merchant pickup location 124 has at least one associated delivery zone. In this example, suppose that the first merchant pickup location 124(1) has an associated first merchant delivery zone 202 that may apply to all items offered by the first merchant 114(1) and ordered by buyers requesting delivery of item orders in zip code 94115. Further, suppose that the second merchant pickup location 124(2) has three different delivery zones, including a first delivery zone 204 that applies to a first item or a first category of items offered by the second merchant to buyers in zip code 94111 when the shared revenue value is R1; a second delivery zone 206 that applies to a second item or second category of items offered by the second merchant to buyers in zip codes 94111 and 94115 when the shared revenue value is R2; and a third delivery zone 208 that applies to a third item or third category of items offered by the second merchant to buyers in zip codes 94111, 94115, and 94103, when the shared revenue value is R3. Additionally, suppose that the third merchant pickup location 124(3) has two different delivery zones, including a first delivery zone 210 that applies to a first item or first category of items offered by the third merchant to buyers in zip code 94103, when the shared revenue value is R1; and a second delivery zone 212 that applies to a second item or second category of items offered by the third merchant to buyers in zip code 94103 and 94116, when the shared revenue value is R2. In this example, R3>R2>R1. In one example, the merchant may have allocated 20% of the revenue from the orders to be shared with the service provider, while another merchant may have allocated 30% and yet another merchant may have allocated 35% of the revenue. In this example, R3, R2, and R1 are 35, 30, and 20% respectively. While shared revenue is used as a parameter to extend or contract delivery boundaries, it will be understood that other parameters such as profit margins, daily-monthly or yearly revenue percentages, percentage of the delivery fee, percentage of the order amount, percentage of the order total, etc. In some cases, the merchant may decide to contribute a certain percentage towards extending boundaries for a specific or group of buyers.

In some examples, the delivery zones 202-212 may be determined in advance, such as by computing a factor referred to as adjusted delivery parameter, based at least on the shared-revenue value. The adjusted delivery parameter, in one implementation, is based at least on calculating the farthest locations in a perimeter around a merchant pickup location that a courier may be able to travel under current local conditions for a given delivery time. Thus, the service computing device may determine based on predicted courier travel times, how far a courier is predicted to be able to travel in multiple directions from the pickup location in an amount of time corresponding to a particular predicted delivery time, and may determine a delivery zone perimeter for the delivery zone based on the how far the courier is predicted to be able to travel in the multiple directions from the pickup location. Thus, when a delivery location 126 is received from a buyer, the service computing may merely overly the delivery zones to determine which zones encompass the delivery location. In other examples, as discussed below with respect to FIG. 4, the delivery zones may be determined with respect to an indicated delivery location and a merchant's relationship with the service provider 104.

Further, there may be a plurality of couriers 120 in the service region. In some examples, the movements of the couriers 120 within the service region may be tracked by the service computing device, such as for determining current traffic conditions within the service region and/or for determining actual courier travel times between a pickup location and a delivery location. This information may be used, at least in part for predicting courier travel times, which may be used at least in part for determining the delivery zones 202-212 at the first time $T_1$, as well as for predicting delivery zones 202-212 at a future time.

In the example of FIG. 2, suppose that a buyer 110 would like to order an item for delivery to the delivery location 126. As one example, the buyer device may use the GPS receiver onboard the buyer device to determine a current location of the buyer device, and may provide this information to the buyer application. The buyer application on the buyer device may determine the delivery location for the order and may present a delivery location in a GUI on the buyer device, as discussed additionally below. In some cases, the buyer device may send the delivery location and an indication of a delivery time to the service computing device. As mentioned above, if the buyer does not enter specified time information, the buyer application may default to an assumption that the buyer would like to order now for immediate delivery, but may provide the buyer with an option for selecting a later delivery time or date. Thus, unless the buyer has specified a later time for delivery, the buyer application need not send time information to the service computing device, and the service computing device may determine a default delivery time interval, such as 30-60 minutes from receipt of the delivery location from the buyer device, 20-65 minutes, or other suitable time period depending on the average times in the local region for completion of delivery orders. In some cases, the determination of the delivery time interval may be based in part on the current time of day at which the communication is received from the buyer device, e.g., if courier times are short when the communication is received, e.g., at 1:30 pm, then the delivery time interval may be shorter (e.g., within the next 45 minutes) than during rush hour, e.g., from 4:30-6:30 PM, when the delivery time interval may be longer (e.g., within the next hour).

Further, as the service computing device receives updates of local conditions, such as from the couriers 120 and/or from web servers or other sources of information, the service computing device may determine the delivery zones 202-212 for the respective merchants 114(1)-114(3). Accordingly, the delivery zones 202-212 may, in some cases, be determined in advance of receiving a communication from the buyer 110. In other cases, however, the delivery zones 202-212 may be determined on the fly after receiving the indicated delivery location from the buyer device and determining a delivery time interval.

In either case, in response to receiving the buyer delivery location 126, and based in part on a delivery time interval, the service computing device (or in some examples, the buyer application) may determine which of the delivery zones 202-212 encompass the delivery location 126. Thus, in this example, the delivery location 126 is included in all three delivery zones 204-208 of the second merchant 114(2), and is included in the first delivery zone 210 of the third merchant 114(3). Further, the delivery location 126 is outside of the delivery zone 202 of the first merchant 114(1) and is outside the second delivery zone 212 of the third merchant 114(3). Accordingly, the service computing device may send merchant and/or item information to the buyer device based on the delivery zones 204, 206, 208 and 210 within which the delivery location 126 is included.

Based on the merchant and/or item information, the buyer device may present a GUI that includes merchants and items and the delivery fee that are available for the buyer to select for delivery during various time periods. Thus, the GUI may indicate that the buyer 110 can order all or selected items or categories of items offered by the second merchant 114(2), and/or the buyer 110 can order item or category of items offered by the third merchant 114(3). In some examples, the GUI presented on the buyer device may omit the first merchant 114(1) and the second item or second category of items offered by the third merchant 114(3). In other examples, these options may be grayed out, crossed out, or otherwise indicated to be not currently selectable for the current delivery time interval. In yet another example, the options may indicate the merchant to provide delivery at higher or substantially lower delivery fee based at least on the shared revenue between the merchant and the service computing device. The delivery zones in this figure are shown to be concentric; however, other shapes and configurations are possible. The delivery zones can expand and contract, for example based on whether the shared revenue parameter increases or decreases for a particular merchant (as shown by various dotted lines). The expansion and contraction can happen concentrically, such that only the radius differs but the center remains the same.

Figure 3:
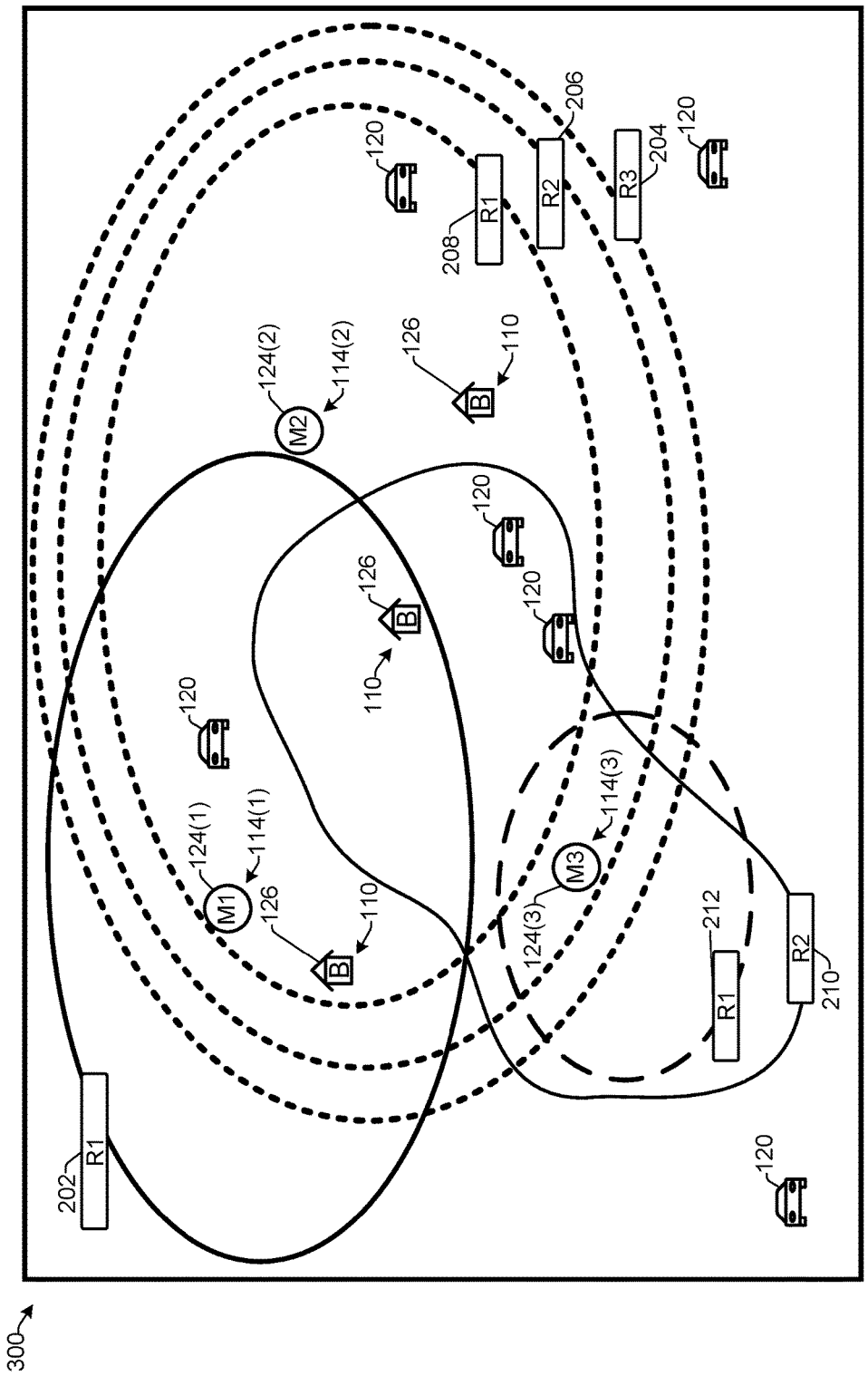
FIG. 3 illustrates the example fluid delivery zones that include previously excluded buyers according to some implementations.

FIG. 3 is a picture illustration of example fluid delivery zones 300 according to a second embodiment of the present subject matter. In this example, suppose that the local conditions have changed, such as delivery costs may have changed as a result of the shared-revenue relationship between the merchants and/or the service or the feedback received from couriers reporting actual delivery cost due to traffic or weather conditions, or the like. Based at least in part on the change in local conditions, some or all of the delivery zones 202-212 may have expanded or contracted based at least in part on a increase or decrease in the adjusted delivery costs to deliver the item from the delivery location 126 from the pickup locations 124 of the merchants 114.

Therefore, as shown, at a first time instant, when the shared-revenue was lower, the third merchant 114(3) may or may not have been able to cater to the buyer's delivery location 126 and as such the buyer's delivery location 126 may not have been in the delivery zone 212 of the third merchant 114(3), but only in the delivery zone 202 of the first merchant 114(1).

To this end, in one embodiment, the service computing device 102 determines the shared revenue parameter between the merchants and the service provider and accordingly expands or contracts the delivery boundaries (from R1 to R2) to cater to buyers who were not originally in the delivery zones. The delivery boundaries are fluid and may or may not adhere to a specific shape or form and may be configured to include specific buyers, locations, or delivery of specific items. The shared revenue parameter corresponds to a financial account that applies towards the original delivery cost, such that buyer's delivery fee is defrayed.

The buyer application may present in a GUI, merchant information that includes all items offered by the first merchant 114(1), as well as the item or category of items offered by the third merchant 114(3). Furthermore, the delivery fee may be substantially similar to or less than the delivery fee applicable to merchants within the buyer's original delivery zone. The service computing device 102 sends updated delivery fees corresponding to the adjusted delivery costs to the buyer device that is displayed on the GUI of the buyer application. So, the buyer application may see the delivery fees for the first merchant's items may be lower, higher or equal than the delivery fees for the third merchant. The merchant may have a shared-revenue value of R1 that excludes the buyer from the delivery zone or causes the delivery fee to be substantially higher. By varying the shared-revenue value from R1 to R2 (e.g., R2>R1), the delivery zone can be varied, for example, fluidly and not conforming to any shape, to include the specific buyer or a group of buyers.

Figure 4:
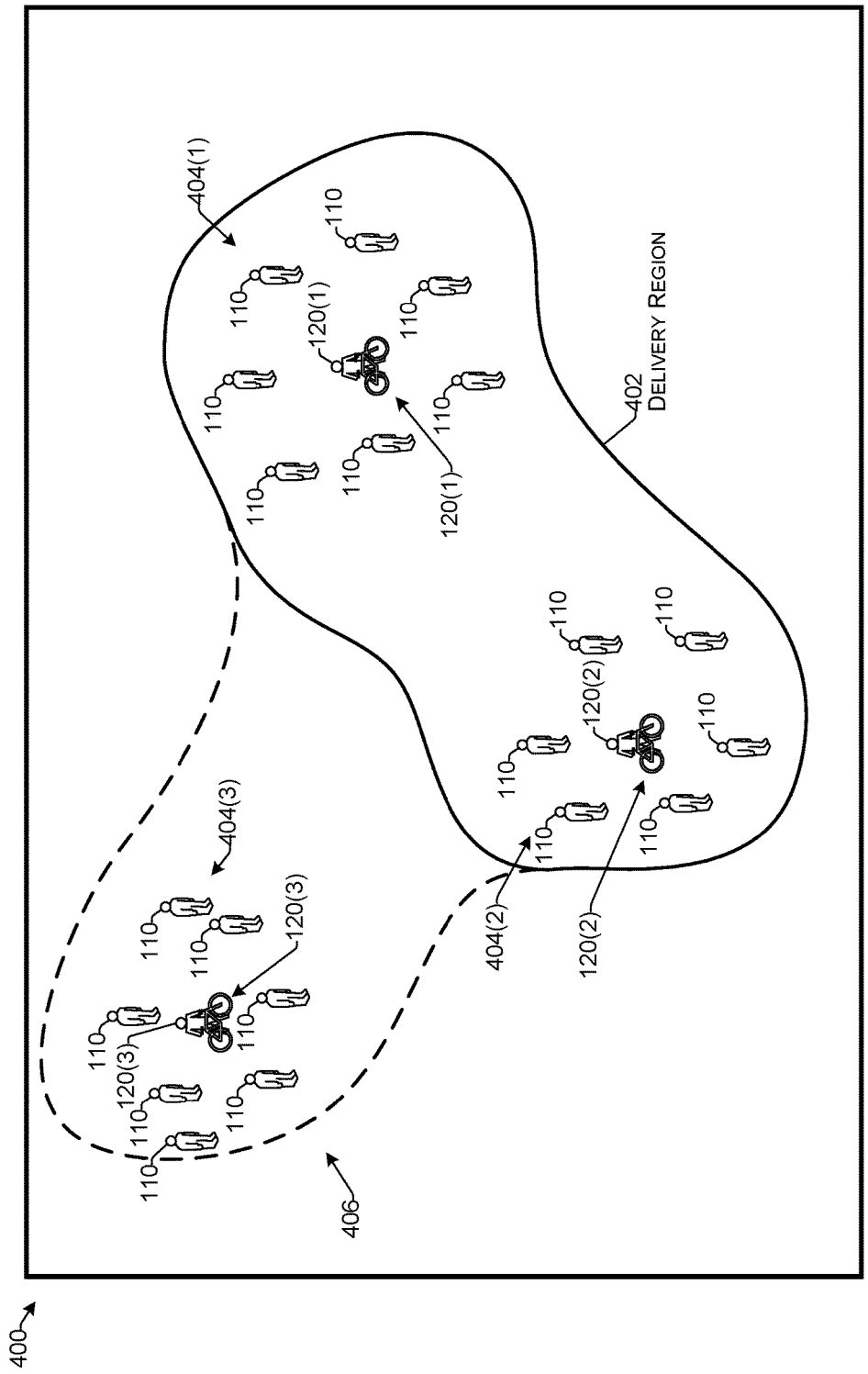
FIG. 4 illustrates example fluid delivery zones determined from a buyer's delivery location according to some implementations.

FIG. 4 illustrates an example of determining fluid delivery zones corresponding to the buyer's delivery location 126 based on the merchant-service provider shared revenue relationship, according to some implementations. The service region is shown in rectangle 400. In this example, rather than determining entire delivery zones around each merchant as in the FIG. 2, delivery zones are determined based on the delivery location 126 of the buyer and/or a delivery time interval. For example, in some cases, the merchant or the service provider may record an increase in demand from a particular buyer location or region. In another example, the merchant or the service provider may record an increase in demand from a particular buyer region and/or time of day, such as during lunchtime on a normal workday. In such cases, the value of merchant's shared revenue parameter may be substantially higher due to increased profit, thus enabling the service computing device 102 or the merchant device to forward a portion of the shared-revenue towards the delivery costs of the buyer.

The service computing device (or the buyer device in some examples) may determine, based at least in part on the shared-revenue parameter and/or local conditions for the delivery time interval, delivery zones that are fluid and dynamic in nature. The delivery region 402 may change dynamically based on the shared-revenue parameter set or determined by the zone determination component 150 and other factors, such that even buyers beyond a threshold travel time of a courier and distance are able to order. This is possible since the service computing device 102 defrays the buyer delivery fee by contributing a portion of the shared revenue towards delivering items from certain merchants to new buyers outside the original delivery zone. As the zone determination component 150 changes delivery boundaries, the order processing component 140 facilitates delivery of items from the newly added merchants in the new delivery zone by mobilizing and re-arranging the couriers. The couriers are arranged to support both actual delivery of items within the reduced delivery costs since the delivery costs are now borne by the service computing device 102.

In the illustrated example, the order processing component 140 may determine to have at least one courier 120(1) stationed at a first courier location and at least one second courier 120(2) stationed at a second courier location. For instance, the first courier location may be selected based at least in part on a prediction that a first plurality of buyers 404(1) will place orders for one or more selected items from the first courier 120(1). Similarly, the second courier location may be selected based at least in part on a prediction that a second plurality of buyers 404(2) will place orders for one or more selected items from the second courier 120(2). The prediction of the number of orders that might be received in a particular area of the delivery region may change depending on the time of day and day of the week. For example, the number of orders received on a weekday may differ substantially from the number of orders received on a weekend day, such as based on whether the area of the delivery region is in a business district or residential district.

In addition, the delivery region 402 may be changed dynamically based on information received from buyer applications of buyers 110 that are located outside of the delivery region 402. For instance, suppose that multiple application-open events are received from a third plurality of buyers 404(3) located in an area outside of the current delivery region 402. In some cases, the zone determination component 150 may use clustering techniques, such as based on the frequency and density of the application-open events to determine a new area 406 to add to the original delivery region 402. For example, the order processing component 140 may determine distances between the locations of the buyers 110 when the application-open events occurred and may assume that these locations would correspond to delivery locations if the third plurality of buyers 404(3) were to place orders for delivery of the items. If the number of application-open events received within a threshold time period are from a sufficient number of buyers 110 to meet a minimum threshold number of buyers, and are clustered in to an area sufficiently close to each other, the order processing component 140 may determine to expand the delivery region to encompass the area 406 that includes the cluster of locations associated with the third plurality of buyers 404(3).

Based on the locations determined from the application-open events received from the third plurality of buyers 404(3), the order processing component 140 may recommend that a third courier 120(3) be stationed at a third courier location that is within a threshold delivery location or travel time of at least some of the plurality of buyers 404(3). In some examples, threshold delivery travel time may be selected such that the third courier 120(3) is able to arrive at the locations associated with the buyers 110 in the third plurality of buyers 404(3) within a threshold time, such as 15 minutes or less. Additionally, in some cases, the third plurality of buyers 404(3) may be determined using clustering techniques. For instance, a centroid may be determined for the cluster, and the third courier location may be selected based at least in part on the cluster centroid. Further, as mentioned above, in some examples the expansion of the delivery region 402 may be for certain times of day, for certain days of the week, and for certain types of items.

The boundaries in this example are shown to be fluid and not conforming to a particular shape or form, however, defined and fixed boundaries may be drawn such that instead of a specific buyer or a buyer region, a number of new buyers are included in the new delivery zone of a specific merchant, based at least on the shared-revenue relationship of the merchant and the entity controlling the couriers.

Figure 5:
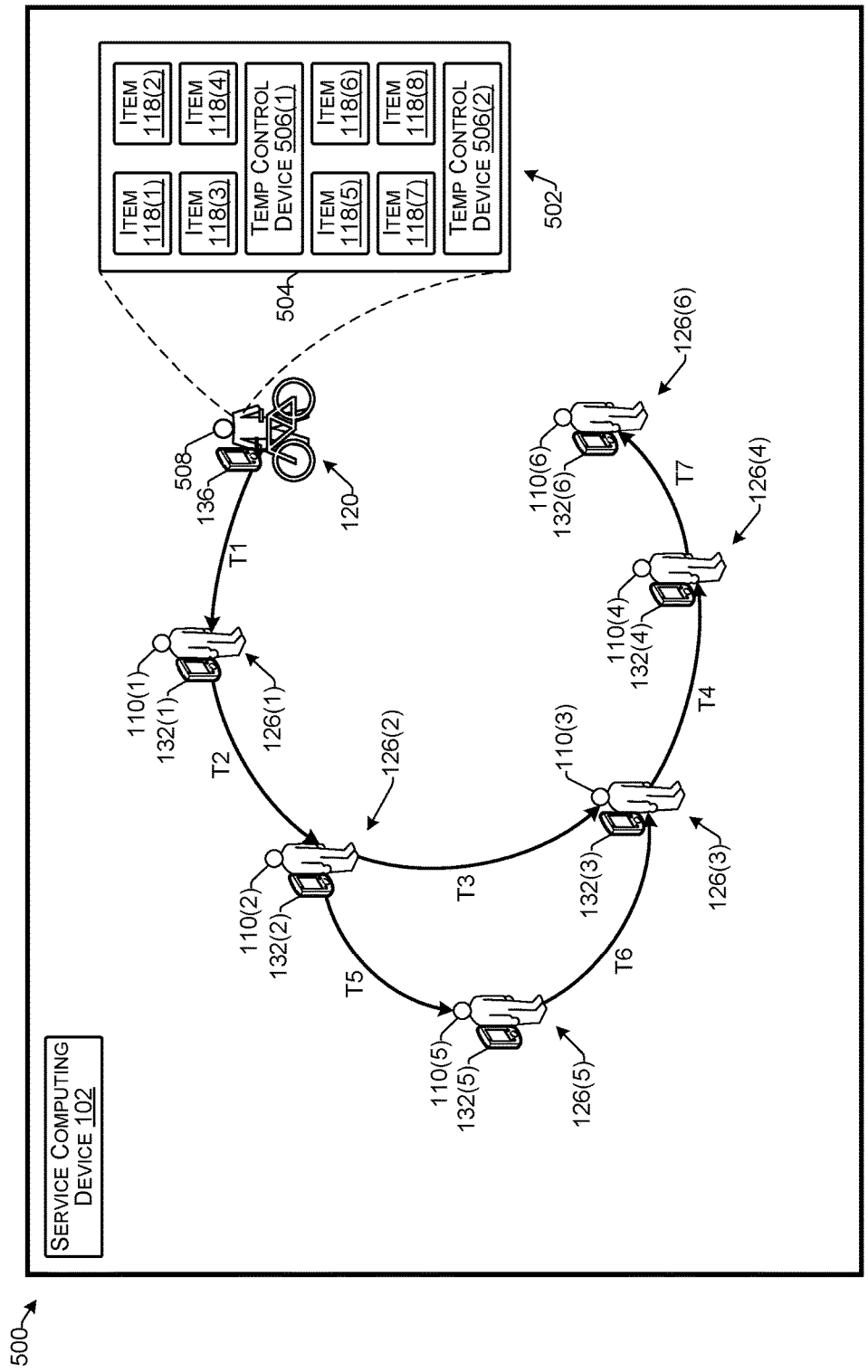
FIG. 5 illustrates an example of determining a courier route for delivery of items to new delivery zones, according to some implementations.

FIG. 5 illustrates an example 500 of determining a courier route for delivery of items to new delivery zones, according to some implementations. As explained above, the delivery boundaries can be dynamically and/or disproportionately varied to include new buyers in regions outside the original delivery zones, for example based at least on a merchant-courier shared revenue parameter. The service computing device 102 may re-route courier paths to support addition of new buyers. One such implementation is explained below. In this example, the courier 120 has items 118 to delivery to a new buyer previously excluded but who is now in a new delivery zone. The items 118 may be contained in an insulated backpack or other type of travel container 502 that includes an insulated outer wall 504 and one or more temperature control devices 506, such as temperature control devices 506(1) and 506(2). For instance, in the case that the items 118 are to be kept hot to avoid spoilage, the temperature control devices 506 may be heat packs. Alternatively, in the case that the items 118 are to be kept cool to avoid spoilage, the temperature control devices 506 may be cold packs.

In this example, suppose that the service computing device 102 receives, from a first buyer device 132(1) associated with a first buyer 110(1) and indication of a first delivery location 126(1). The service computing device may determine that a location 120 of the courier 508 is within a threshold delivery travel time of the first delivery location 126(1). For example, the service computing device may use map information, as discussed additionally below, to determine the distance from the courier location 120 to the first delivery location 126(1). Based on this distance, the service computing device 102 may determine that the estimated time travel time for the courier 508 from the current courier location to the first delivery location is a time T1. The service computing device may further determine that time T1 is less than the minimum threshold travel time. In some examples, the determination of the time T1 may be based on a large number of past deliveries made by couriers in the current delivery area, or in geographically similar to delivery areas. Further, in some cases the determination may be based in part on the type of vehicle that the courier 508 is using, whereas in other examples, the determination may be made without regard to the type of vehicle. For instance, when travel distances are short a motorized vehicle may have little advantages over a bicycle.

Based on the determination that the courier 508 is within the threshold delivery time of the first delivery location 126(1), the service computing device 102 may send item information to the first buyer device 132(1), which may include information about the type of item in the couriers travel container 502. In this example, suppose that the first buyer 110(1) places an order for items 118. In response, the service computing device 102 may send, to the courier device 136, first order information for a first order for items 118 to be delivered to the first buyer 110(1) at the first delivery location 126(1). The courier 508 may use the courier device 136 to acknowledge receipt of the order, and may begin traveling toward the first delivery location 126(1).

In the meanwhile, suppose that two additional buyers 110(2) and 110(3) have provided information regarding their respective delivery locations 126(2) and 126(3) via their respective buyer devices 132(2) and 132(3). The delivery locations 126(2) and 126(3) are further away from the merchant's original delivery zone, however due to the merchant-courier shared relationship, the service computing device 102 has expanded the delivery zone beyond the original delivery zone to now include both delivery locations 126(2) and 126(3).

The service computing device 102 may determine that the courier 508 is within the threshold delivery time of the second delivery location 126(2) and the third delivery location 126(3). Accordingly, the service computing device 102 may send item information to the second buyer device 132(2) in the third buyer device 132(3) based on the inventory in the courier's travel container 502. Suppose that the second buyer orders one item 118 and the third buyer orders three items 118. The service computing device 102 may determine that the travel time T2 (i.e., from the first delivery location 126(1) to the second delivery location 126(2)) plus the travel time T3 (i.e., from the second delivery location 126(2) to the third delivery location 126(3)) plus the remainder of the travel time from the courier's current location to the first delivery location 126(1) is less than the threshold travel time for delivery of the item to the third delivery location 126(3). Accordingly, the service computing device 102 may accept the orders from the second buyer and the third buyer, and may send order information for these orders to the courier device 136. Further, the service computing device 102 may note that the courier only has five available items 118 remaining in the inventory of the courier 508. Furthermore, suppose that after the courier 508 delivers the first order to the first buyer 110(1), the service computing device 102 receives two more orders, e.g., a fourth order from a fourth buyer 110(4) for two items 118 to be delivered to a fourth delivery location 126(4), and a fifth order from a fifth buyer 110(5) for one item 118 to be delivered to a fifth delivery location 126(5). Furthermore, suppose that the time T5 from the second delivery location 126(2) to the fifth delivery location 126(5) plus the time T6 from the fifth delivery location 126(5) to the third delivery location 126(3) is not substantially greater than the time T3. Accordingly, the service computing device 102 may reroute the courier to the fifth delivery location 126(5) and then to the third delivery location 126(3), while still enabling the courier to deliver the items 118 to the third delivery location 126(3) under the threshold total travel time.

Additionally, prior to the fifth buyer 110(5) placing the fifth order, suppose that a sixth buyer 110(6) had opened the application on the buyer device 132(6), but had not yet placed an order. For example, the service computing device may have determined that a courier travel time to the sixth delivery location 126(6) is within the threshold travel time of the courier when taking into consideration, the travel times to which the courier is already committed. Subsequently, after the fifth buyer places the fifth order, the courier 508 no longer has any items available in inventory. Because all of the items in the courier's inventory have been ordered by other buyers, if the sixth buyer 110(6) attempts to place an order for one of the items, the sixth buyer 110(6) may be informed that the item is no longer available despite the travel time T7 being within the threshold delivery travel time. In some examples, the sixth buyer 110(6) may be able to request a notification when another courier is within a threshold travel time of the sixth delivery location 126(6). Alternatively, if the service computing device 102 has already assigned another courier to the area, the sixth buyer 110(6) may be able to order an item from the other courier's inventory.

Figure 6:
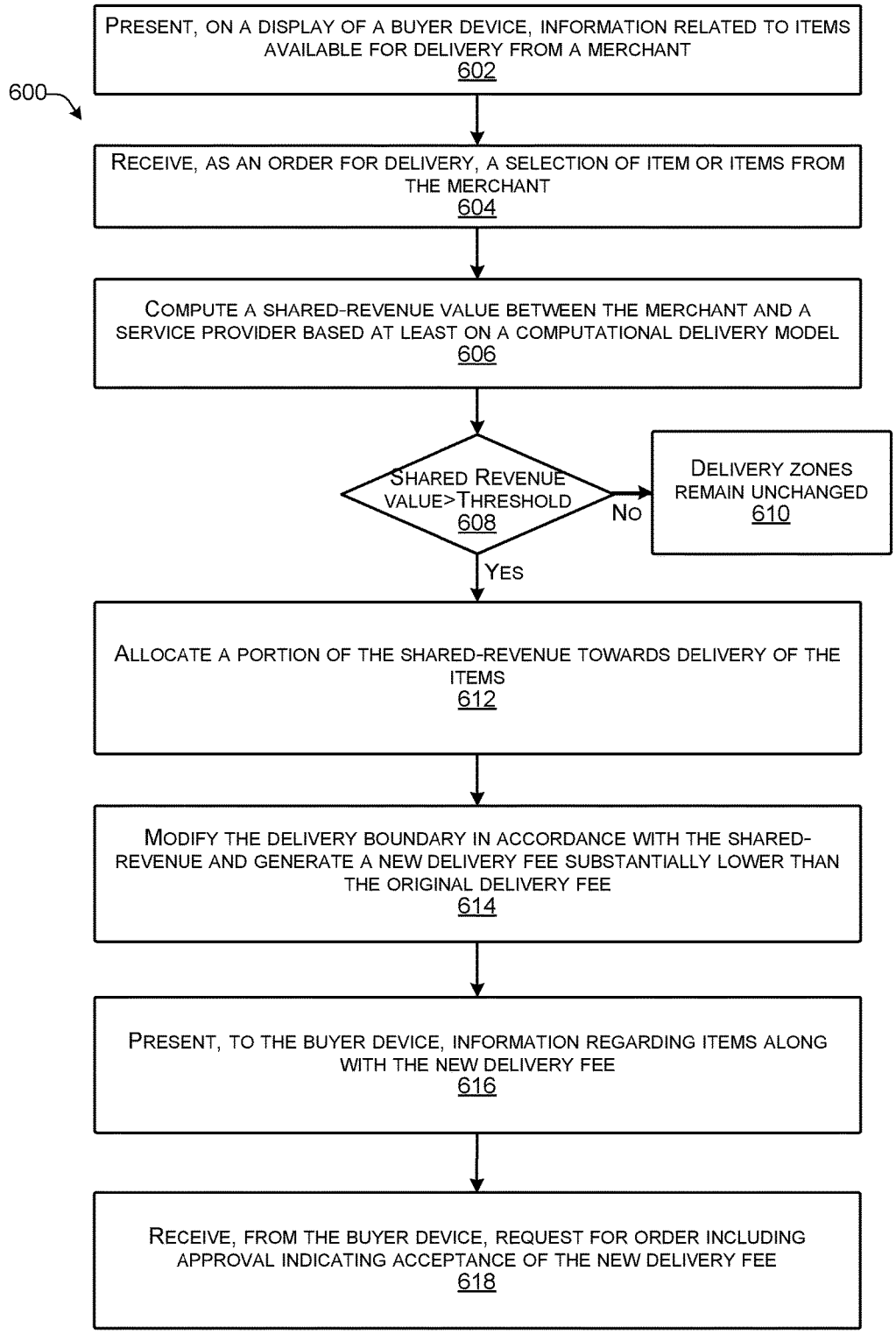
FIG. 6 is a flow diagram illustrating an example process for determining delivery zones based on shared-revenue values, according to some implementations.
Figure 7:
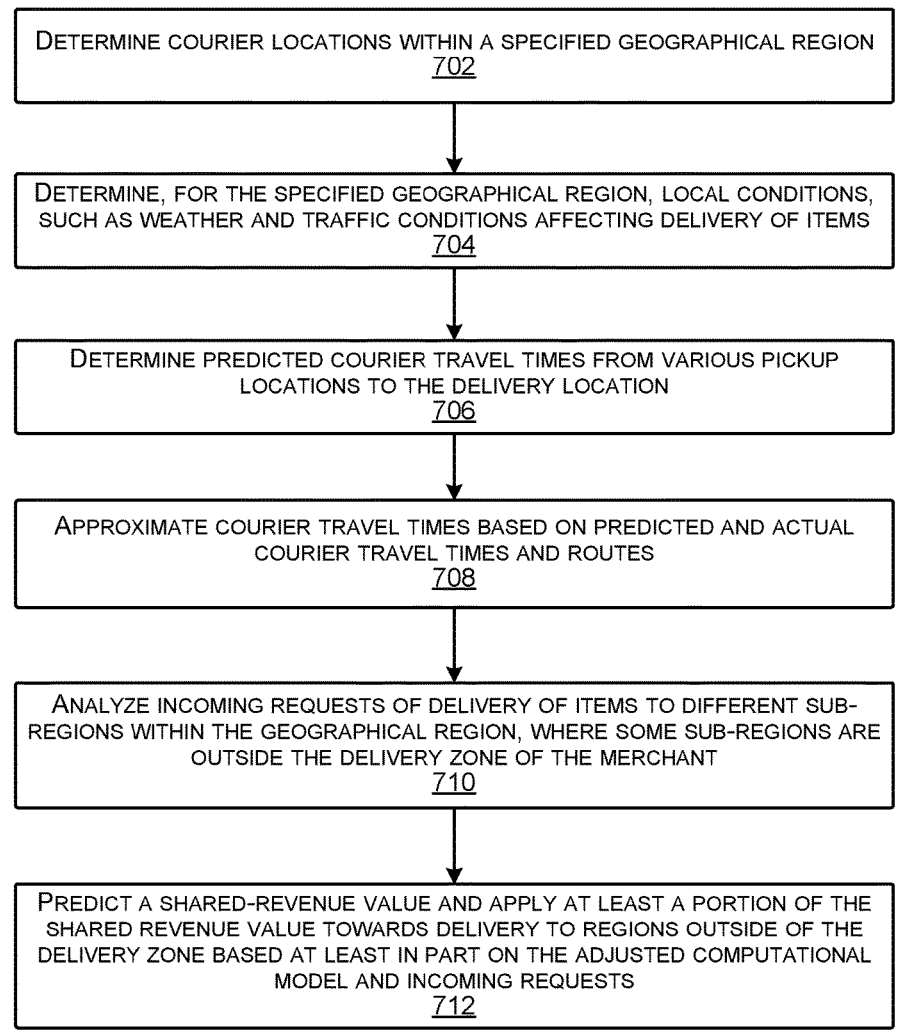
FIG. 7 is a flow diagram illustrating an example process for determining predicted shared-revenue values for merchants, according to some implementations.

FIGS. 6 and 7 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 6 is a flow diagram illustrating an example process 600 for determining item information based on fluid delivery zones according to some implementations. In some examples, the process may be executed in part by the service computing device 102 and in part by the buyer device 132.

At 602, the buyer device, as may determine, for a plurality of merchants, pickup locations and items offered by the merchants for delivery. For example, each merchant may be associated with a merchant pickup location and at least one item that is offered for delivery. For this, the service computing device 102 in conjunction with the merchant device may present, on a display of the device, information related to items available for delivery from a plurality of merchants. For example, the device may present a graphic user interface that enables the buyer to select a particular merchant, and select one or more items to order from the particular merchant.

At 604, the service computing device may receive, as an order for delivery, a selection of item or items to order from a first merchant of the plurality of merchants. For instance, the buyer may select a particular item from a particular merchant as a first order. The buyer may or may not send the first order information to the service computing device at this time. The service computing device may receive, from a buyer device, an indicated delivery location and may determine a delivery time interval. For example, the deliver time interval may be determined based on the time at which the communication of the delivery location is received from the buyer device, or may be determined based on time information received from the buyer device, such as in the case that the buyer would like delivery at a later time or on a later day. In some examples, the indicated delivery location may be based at least in part on a geographic location of the buyer device determined through information from a GPS receiver included in the buyer device. In other examples, the indicated delivery location may be a default location, may be entered manually by the buyer, and/or may be a previously used location. In this example, the buyer location may be at a distance more than the threshold distance from the merchant location. In other words, the buyer may not be in an originally determined delivery zone, and as such the delivery fee may either be high or unavailable at this point. To provide delivery, the following steps may be applied.

At 606, the device may compute a shared-revenue value. This value may either be stored in a database and fixed for all orders, or it may be computed in real-time. For example, based on merchant's inventory, past orders, local event information, weather and traffic conditions, a computational delivery model may compute a shared-revenue value. The shared revenue value, in one example, configures the delivery cost structure, and is in some cases, directly proportional to the delivery fee.

At 608, the device may determine whether a shared-revenue value corresponding to the merchant is above a threshold value. For example, the determination is made based on a database that has either a fixed shared-revenue value or a predicted value at that point in time.

If the shared-revenue value is lower than a threshold value ("No" branch), the service computing device keeps the delivery zones unchanged as shown in step 610. For example, the delivery zones may be determined based on the distance of the merchant from the buyers.

However, if the shared-revenue value is more than a threshold value ("Yes" branch), the service computing device may determine, for the items, respective fixed or current shared-revenue values corresponding to each of the items or the merchant as shown in step 612. In some cases, the service computing device may predict delivery zones based at least in part on spoilage times provided by the respective merchants. The predicted spoilage times may further be predicted based at least in part on feedback received from a plurality of buyer devices associated with a plurality of different buyers and/or feedback received from courier devices associated with respective couriers. The predicted spoilage times may further be predicated based at least in part on predicted weather conditions for the region.

At 614, the service computing device determine the courier route and courier travel times from the respective pickup locations to the delivery location for a plurality of time periods. For instance, the predicted courier travel times may be determined for a current time period based on current traffic, current weather, etc. Further, the predicted courier travel times may be determined for one or more later time periods, such as based on predicted traffic, predicted weather, predicted local events, and so forth. As discussed above with respect to FIG. 1, past order information and other information may be considered with determining the predicted courier travel times. Accordingly, the service computing device may determine a courier route with say least spoilage time or least courier time or both. Then, the service computing device allocates a portion of the shared revenue towards the delivery of items to buyers, such as those outside the original delivery zone and the remaining cost is used to determined a delivery fee to the buyer. The service computing device may determine a delivery fee to the buyer and generate such a fee based on the shared-revenue values and other rules.

At 616, the service computing device may send item information about the items to the buyer device. For example, the service computing device may send the merchant and item information to the buyer device in response to receiving the indicated delivery location and based on a determined delivery time interval. In other examples, the buyer application on the buyer device may determine the merchant and item information based information received from the service computing device and/or other sources. The device also sends for display the new delivery fee that allows previously excluded buyers to buy at discounted or nominal delivery fees.

At 618, the device receives approval from a buyer through a buyer device indicating acceptance of the new delivery fee and the order details. Accordingly, the device applies the optimal courier route by implementing the new delivery fee and the portion of shared revenue towards delivery.

FIG. 7 is a flow diagram illustrating an example process 700 for determining an optimal shared-revenue value according to some implementations. In some examples, the process may be executed by the service computing device 102 or by another suitable computing device.

At 702, the computing device may receive, over time, from a plurality of courier devices associated with a plurality of couriers, electronic communications indicating respective geographic locations of the courier devices in a region based on information from GPS receivers onboard the courier devices. The extent of this region is decided by the maximum possible shared value. Thus assuming 50% of the revenue shared towards the delivery can be applied towards the delivery, the regions can be further away than current delivery zones. Furthermore, the new regions may not currently have couriers stationed, in which case, default or historic information may be used. In other examples, the region may be specified by the largest area that a merchant wishes to cater to.

At 704, the computing device may determine, at least in part from the received courier device locations, local conditions such as weather conditions and traffic conditions in the region.

At 706, the computing device may determine predicted courier travel times from various merchant locations to delivery locations and/or to potential delivery locations based at least in part on the traffic conditions in the region. In some cases, this determination may be based on methods that are exhaustive but computation and resource intensive, e.g., brute force algorithms covering all possible merchants and all possible buyers using all couriers available. In other cases, the determination may be random and sample-based and requiring less computation power, e.g., Monte-Carlo simulation and other heuristic based models.

At 708, the computing device may determine, at least in part from the received courier device locations, predicted and actual courier travel times for a particular order, based on a first time at which a respective courier picked up the order from a merchant pickup location and a second time at which the respective courier delivered the order to the delivery location. The computing device may compare the actual courier travel time with a predicted courier travel time for the particular order to determine a difference between the predicted courier travel time and the actual courier travel time. The computing device may adjust a computational model or other technique for determining the predicted courier travel times based at least in part on the difference between the actual courier travel time and the predicted courier travel time.

At 710, the computing device may determine, at least in part, requests of items from a specific merchant in the region. The requests may be received through buyer applications from all buyers in the region.

At 712, based on the demand, the computing device may predict a shared-revenue value different from the current shared-revenue value to fulfill the requests of buyers in the region outside of the merchant's current delivery zone. The shared-revenue value may also be based on the predicted courier times. The display may include a scale for the merchant to experiment with and choose a value that allows him to make profits while expanding market reach. The merchant may fix or choose to keep the shared revenue value variable with time and as demand grows or reduces.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
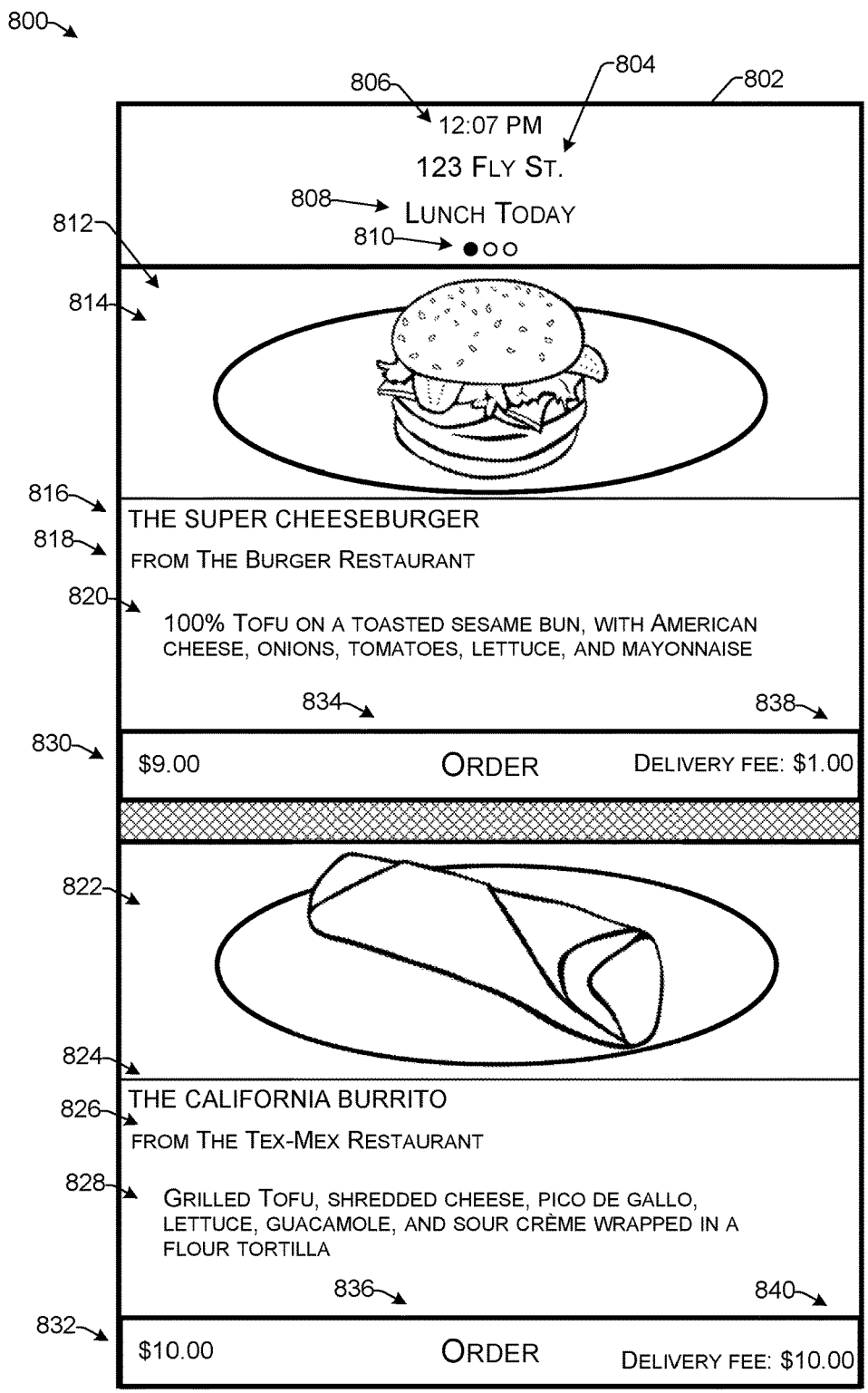
FIG. 8 illustrates an example graphic user interface for presentation on a buyer device according to some implementations.

FIG. 8 illustrates an example graphic user interface (GUI) 800 for presenting item information on a display 802 associated with a buyer app 134(1) on the buyer device 132 according to some implementations. The GUI 800 presents information about one or more merchants (M1 and M2) that may be selected for delivery to enable a buyer to use the buyer device 132 to place an order for one or more of the items. As one example, the GUI 800 may be presented when a buyer accesses the buyer application 134 on the buyer device 132 to browse through a listing of merchants from whom the buyer may order items for delivery. The buyer application may determine the delivery location 804 to which the buyer is seeking delivery and may send the intended delivery location to the service computing device. For instance, when the buyer initially opens the buyer application on the buyer device 132, the buyer application may request that the buyer confirm a determined delivery location 804, such as by tapping on or otherwise selecting a virtual control (not shown in FIG. 8) presented on the display 802. When the buyer has verified or otherwise specified the delivery location 804 for the order, the buyer application may cause the buyer device to send the delivery location 804 to the service computing device.

The GUI 800 includes the indicated delivery location 804, such as an address to which the buyer's order is to be delivered. In some examples, the delivery location 804 may be determined by the buyer application based on a current location of the buyer device 132, as indicated, e.g., by one or more location sensors included in the buyer device 132. For example, the current location may be determined from GPS information provided by an onboard GPS receiver, and/or from wireless access point information, cell tower information, or the like, determined through one or more communication interfaces, and/or through various other techniques In some examples, the delivery location 804 may be entered manually by the buyer, may have been previously used by the buyer, and/or may be a default location that may be changed by the buyer through interaction of the buyer with the GUI 800. As mentioned above, in some examples, the items available for delivery may change based on the indicated delivery location 804. Accordingly, the buyer application may determine the indicated delivery location 804 prior to presentation of the item information.

In response to receiving the delivery location, the service computing device may send, to the buyer on his buyer application 134(1), a listing of merchants (e.g., M1, M2 and so on) with whom the buyer is able to place an order. In addition, the service computing device may compare the intended delivery location with any locations beyond a threshold distance of the delivery location 804 of the buyer, but offering a delivery fee lower than a predetermined delivery fee.

The GUI 800 further includes a current time 806, and an indication 808 that the user is ordering for a current delivery period, which is lunch time in this example. Further, the GUI 800 includes an indicator 810 that the user may swipe the screen view items available at other delivery periods, such as dinner time or lunch tomorrow. In some cases, various different items obtained from different merchants may be available based on the time of day and day of the week.

As one example, a buyer who is interested in paying a specific reduced delivery fee may be presented with a listing of merchants offering the specific delivery fee irrespective of the distance of the merchant from the buyer's delivery location. In one implementation, the reduced delivery fee is a factor of the shared revenue parameter corresponding to merchants in a geographical region, e.g., a city. So, the delivery fee is higher for merchants having lower shared revenue and lower for merchants having higher shared revenue values. The delivery fee may also be a factor of the distance of the delivery location from the merchant's pick up location. So, the delivery fee may be relatively lower for a buyer's location that is close to the merchant than further away. In addition, a portion of the higher shared-revenue can be used to either eliminate or substantially reduce the delivery fee paid by the buyer. The buyer may select a merchant from this list for placing an order, which may result in a discounted delivery fee for the order. As mentioned above, the list of merchants available for discounted delivery may include merchants within a threshold proximity to merchants having orders pending. As another example, if the buyer does not care to order from the merchants currently available for discounted delivery, the buyer may indicate a desire to be notified when additional merchants are selected for orders to be delivered to a delivery location within a threshold distance of the buyer's delivery location. As still another example, the buyer may indicate a desire to be notified whenever a particular merchant that is not currently in the delivery zone that will be delivered to a delivery location within a threshold distance of the buyer's delivery location.

In the illustrated example, the GUI 800 presents item information 812 about two merchants and items offered by the merchants. The merchants offering delivery to the buyer's location are listed on the interface, and are listed in order of distance as well as the cost of delivery to the buyer. As described above, in one implementation, the merchants may or may not be in proximity to the buyer and as such some merchants may be further away. The merchants outside of the original delivery zone of the buyer may be listed due to application of the service computing device 102 to apportion a part of the shared revenue towards delivery costs. In this manner, the GUI 800 may present information about a plurality of merchants from whom the buyer is able to order items for delivery, some of whom may be associated with discounted delivery fees.

For example, the buyer may scroll through the listing of merchants, select a merchant from which to order, and then be presented with a menu of the items provided by the selected merchant. The item information 812 includes a representative image 814 and a name 816 of one item (as shown), e.g., "The Super Cheeseburger" or all items (not shown). The item information for the first item may further indicate the merchant name 818, e.g., "The Burger Restaurant", and a description 820 of the first item. In addition, the item information for the second item may include a representative image 822, and a name 824 of another item, e.g., "The California Burrito". The item information for other item may further include the merchant name 826, e.g., "The Tex-Mex Restaurant", and a description 828 of the second item. Further, while information about two items is presented in this example, information about other items, if currently available for delivery, may be presented in the GUI 800 by the buyer scrolling or otherwise traversing through the item information.

By default, the buyer application may be configured to assume that the buyer wishes to order an item for delivery as soon as possible, rather than at some point later in the day or the next day. Accordingly, based on this assumption, the GUI 800 may default to presenting item availability based on the buyer wanting to order now and have delivery within, e.g., 15 minutes. In some examples, if the buyer alternatively wishes to have the order delivered at a later time, the buyer may be presented with an option for specifying a later delivery time.

Based on the assumption that the buyer would like to order an item now, the buyer application may receive and present merchant information for the current time period, e.g., as if the buyer wants the order placed immediately. Thus, the user interface 800 may present the merchant information for based on factors such as shared revenue relationship, demand, current inventory of couriers within a threshold delivery travel time of the indicated delivery location 804 of the buyer, local conditions, such as weather, etc.

For instance, as mentioned above, the order processing component may determine couriers within a threshold delivery travel time of the delivery location 804, determine the current inventories of those couriers, and may send merchant and item information to the buyer based on the current inventories and delivery fee structure determined based on the shared-revenue relationship. In some examples, the threshold delivery travel time may be based on the ability of a courier to arrive at the delivery location within a threshold time such as 15 minutes or less and/or within the delivery cost allocated by the service computing device 102. The travel time may be determined based on the distance between the courier location and the delivery location and, in some cases, further based on the type of vehicle that the courier is using. Accordingly, in some cases, the threshold distance may change somewhat depending on current traffic conditions, an area of a city in which the delivery location is located, and so forth, but the threshold delivery travel time may be constant.

The GUI 800 may further include a price 830 for the first item and a price 832 for the second item. For instance, the buyer may tap on or otherwise select a first area 834 of the GUI 800 to select the first item, or the buyer may tap on or otherwise select a second area 836 of the GUI 800 to select the second item. Accordingly, the areas 834 and 836 may serve as virtual controls to enable the buyer to select one of the merchants or even items from multiple merchants for delivery. In some examples, a delivery fee may be included in the prices 830 and 832 of the items presented in the GUI 800, while in other examples, a separate delivery fee may be added to a total presented in subsequent user interface presented to the buyer following selection of one of the virtual controls 834 or 836. For example, the delivery fee of $1.00 may be added to the merchant M1 that is within 2 miles of the delivery location 804; however, for the same distance merchant M2 may offer free delivery due to a higher shared revenue relationship with the couriers. This is shown through fields 838 and 840. If the current buyer is not interested in the merchants available to be selected for a delivery discount, the buyer may select from any of the other merchants listed in the GUI 800, such as The Italian Restaurant, or any other merchant presented in the GUI 800. In some cases, a message may be presented to indicate that higher delivery fee prices are in effect for these merchants. Further, in some cases, the current buyer may request to be notified when additional merchants become available for discounted delivery, or when a particular merchant becomes available for discounted delivery. At all other times, the GUI 800 may show higher delivery fee against the specific merchant.

Figure 9:
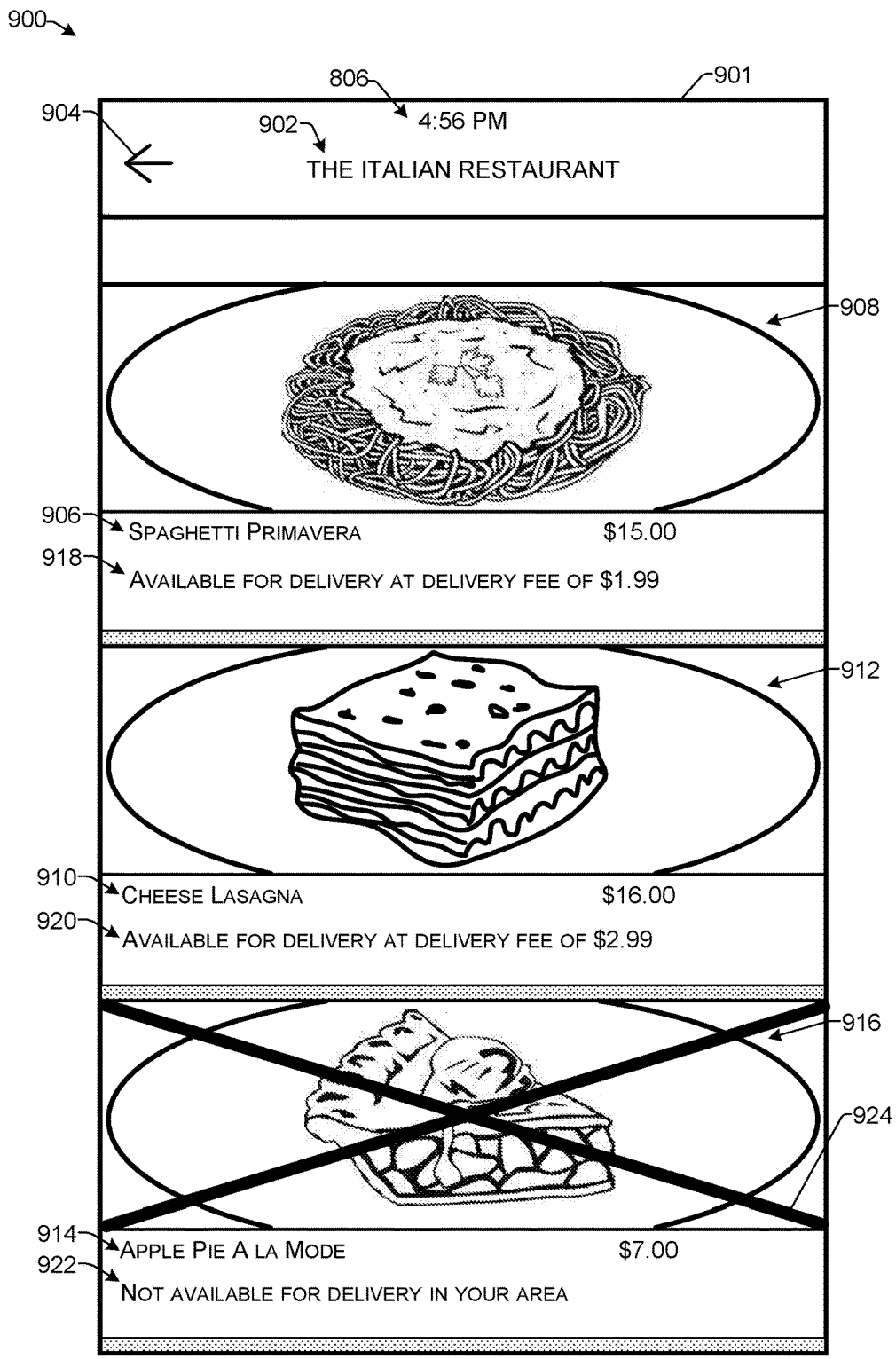
FIG. 9 illustrates an example graphic user interface for presentation on a buyer device according to some implementations.

FIG. 9 illustrates an example GUI 900 that may be presented on the display 901, such as in the case that the buyer selects The Italian Restaurant to browse items available from this merchant and a delivery fee specific to each item. The GUI 900 may present the name 902 of the selected merchant and, as indicated at 904, may provide a virtual control to enable the buyer to go back to the GUI 800 to select a different merchant, if desired. The GUI 900 may further present a plurality of items available from the selected merchant, such as a name 906 and a representative image 908 of a first item, "Spaghetti Primavera", a name 910 and representative image 912 of a second item, "Cheese Lasagna", and a name 914 and representative image 916 of a third item, "Apple Pie À la Mode". Further, while three items are illustrated in the GUI 900 in this example, numerous other items may be available from the selected merchant and may be viewed, e.g., by scrolling or otherwise traversing through the GUI 900.

In the illustrated example, the Spaghetti Primavera and the Cheese Lasagna are available for ordering at a delivery fee of $1.99 and $2.99 respectively, while the Apple Pie À la Mode is not currently available for ordering. For example, suppose that the Spaghetti Primavera and the Cheese Lasagna are categorized in a first category of items offered by the merchant, and have a shared-revenue relationship of 50% and 25% respectively while the Apple Pie À la Mode is categorized in a second category of items offered by the merchant, and has no shared-revenue relationship associated with it.

Furthermore, suppose that with local conditions taken into consideration, such as current traffic, weather, and local events, the predicted courier travel time from the pickup location of The Italian Restaurant to the delivery location specified by the buyer is predicted to be 21 minutes. Consequently, the delivery location is treated as outside of the delivery zone of The Italian Restaurant with regards to the Apple Pie À la Mode, but the delivery location is treated as inside the delivery zone of The Italian Restaurant with regards to the Spaghetti Primavera and the Cheese Lasagna. Furthermore, based on the shared-revenue relationship, the delivery fee may be set at $1.99 and $2.99 respectively. Consequently, as indicated at 918 and 920, respectively, the Spaghetti Primavera and the Cheese Lasagna are indicated to be available for immediate delivery, while as indicated at 922, the Apple Pie À la Mode is indicated to not be available for delivery until a future time or until the shared-revenue relationship for that item changes. Further, to visually indicate that the Apple Pie À la Mode is not available for selection at this time, a graphic indicator 924 may be included in addition to the text 922 such as by overlaying a strike-through, fading or graying-out information about the Apple Pie À la Mode, or the like.

As one example, suppose that the current time is 4:56 PM (and the buyer is using the buyer application on the buyer device 132 to order dinner. The buyer application may receive the merchant and/or item information from the zone determination component on the service computing device, and may present the merchant information and the respective items available from each merchant. For instance, if the buyer wants to order the Cheeses Lasagna, elects to have the order immediately queued with the merchant 902, and delivered as soon as the order is ready, the buyer may select the Cheese Lasagna and proceed with placing the order. In some examples, to place an order, the buyer may select the name or the representation of one or more of the items, such as by tapping on a particular item representation or by tapping on a zone associated with the particular item. The buyer may then subsequently be presented with a pop-up window, a separate GUI, or the like (not shown in FIG. 9), asking the buyer to select or confirm a delivery time interval and delivery price for the selected item. Accordingly, the buyer may select any of the available items to be delivered within the desired delivery interval in this example. Alternatively, if the buyer also wants the Apple Pie À la Mode and can wait until the delivery fee becomes a certain value to have the order delivered, the buyer may change the desired delivery time interval, and may select the Apple Pie À la Mode and the Cheese Lasagna for delivery at the later delivery time interval.

Alternatively, in some examples, rather than presenting the buyer with an indication of when the unavailable item (or unavailable merchant) may become available at a certain delivery price, the GUI 900 may merely indicate that the unavailable item (or merchant) may be available for ordering at a later time, and the GUI 900 may provide an option for the buyer to request a notification. Thus, the buyer may request that the service notify the buyer when a particular item, or a particular merchant, becomes available to be selected for a delivery to the indicated delivery location and at a delivery fee. When the traffic and/or other local conditions have changed sufficiently, so that a predicted delivery price is expected to be lesser than the current delivery price, the service may notify the buyer, such as by sending an in-application message, an SMS (short messaging service) text message, an email, or other electronic communication to the buyer device. For instance, the service may project that this change in local condition will occur at a certain time, and may notify that buyer a threshold amount of time earlier so that the buyer may place the order, and the order will be ready for pickup by a courier by the time local condition has changed as predicted. For example, the shared revenue may change with time or an item as the demand for the item or items changes over time. Accordingly, the merchant may choose to increase or decrease the shared revenue factor to expand and contract the delivery boundaries.

Figure 10:
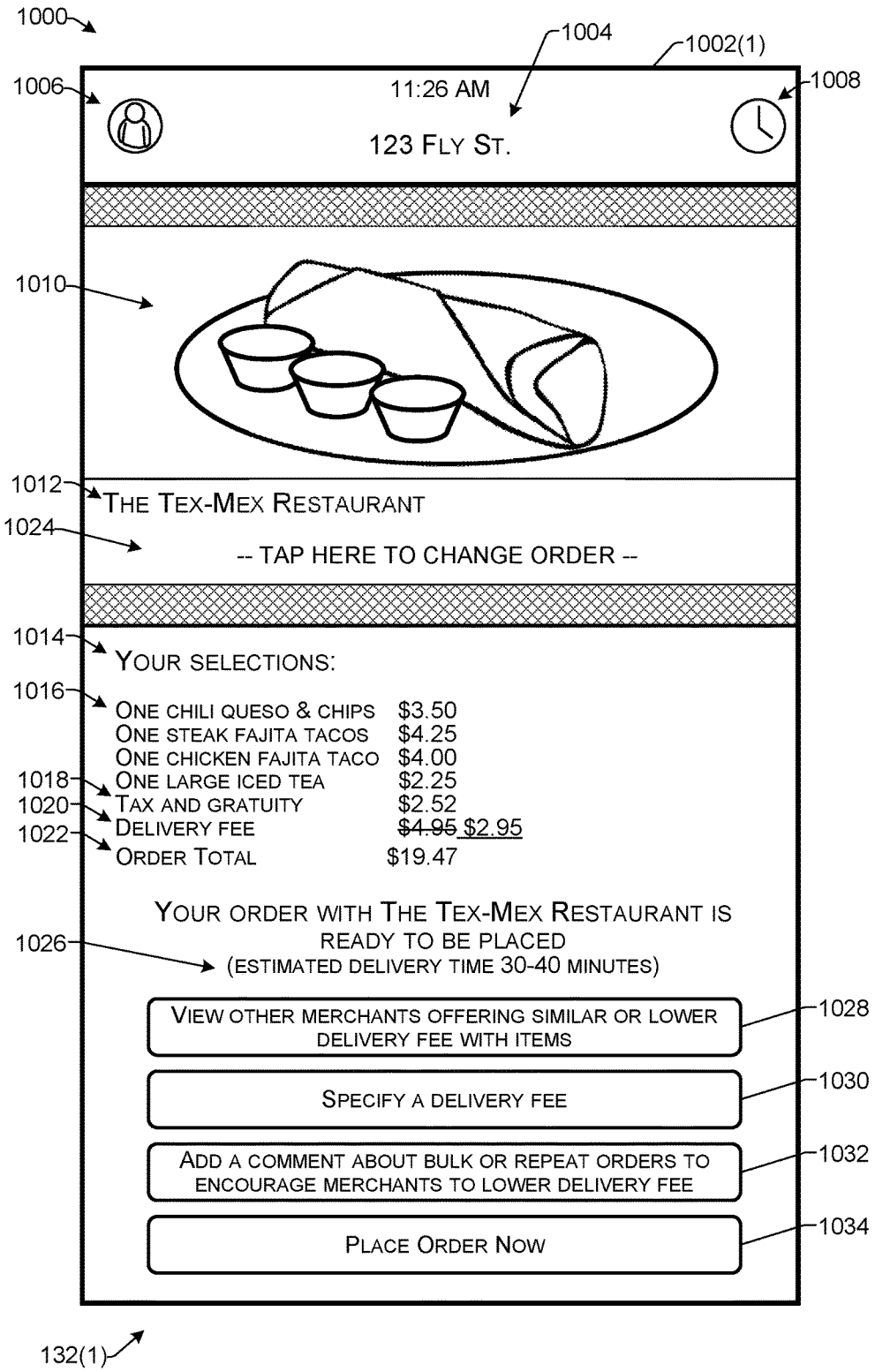
FIG. 10 illustrates an example graphic user interface for presentation on a buyer device according to some implementations.

FIG. 10 illustrates an example GUI 1000 that may be presented on a display 1002(1) associated with the first buyer app 134(1) according to some implementations. The GUI 1000 presents information, such as information related to an order to be placed by the first buyer 110(1) using the first buyer app 134(1). The GUI 1000 includes a delivery address 1004 to which the order will be delivered. In some examples, the delivery address 1004 may be determined by the buyer application based on a current location of a device associated with the first buyer 110(1). For example, the current location may be determined from GPS information provided by an on-board GPS device, wireless access point information, cell tower information, and/or through various other techniques.

In some examples, the delivery location 1004 may have been previously entered by the first buyer as 126(1) and/or may be a default location that may be changed by the first buyer through interaction of the first buyer with the GUI 1000. For instance, suppose that when placing the order, the first buyer is at work, but is planning to go home to receive the order. Accordingly, the first buyer may specify the delivery location 1004 to be the home address of the first buyer even though the first buyer is not currently near the home address.

The GUI 1000 further includes a user icon 1006 that the first buyer may select to change an account associated with the order, or to access other account information of the first buyer's account. Additionally, the GUI 1000 includes a clock icon 1008 that the first buyer may select to change a time associated with the order, such as for scheduling the order to be delivered at a later time, e.g., later in the day, on a future date, or the like.

In the illustrated example, suppose that the first buyer has selected a particular merchant, which in this example is the Tex-Mex Restaurant, which is indicated by an identifying image 1010 associated with the merchant, and a text name 1012 of the merchant in the GUI 1000. Further, suppose that the first buyer has already completed selection of several items from a menu of the selected merchant. Accordingly, as indicated at 1014, the GUI 1000 may present the selections made by the first buyer, which may include a listing 1016 of the selected items and the price for each selected item. The listing 1016 may further include a tax and gratuity amount 1018 to be charged for the order, a delivery fee 1020 to be charged for the order, and an order total amount 1022 to be charged for the order. The GUI 1000 may indicate to the first buyer that the delivery fee is a discounted fee and is therefore, not what would have been normally charged to the first buyer (shown by striking off the normal delivery fee). The difference between the normal delivery fee and the discounted fee may be sent to the service. The service applies funds stored as a result of a shared-revenue relationship between the merchant and the courier service towards the difference. In some cases, the delivery fee may vary in real-time as the shared-revenue varies. For example, if the volume of orders increases on a particular day or at a certain time, the merchant can set a higher shared revenue, which can be used to offset the delivery fee for buyers in the current delivery zone or expand the delivery zone to include new buyers.

If the first buyer desires to make any changes to the items selected, the first buyer may tap or otherwise select an area 1024 in the GUI 1000 to either add more items or remove a selected item. As indicated at 1026, the GUI 1000 may further present an estimated delivery time for the order if the first buyer were to proceed immediately with placement of the order.

The GUI 1000 further includes a plurality of virtual controls that may be selected by the first buyer for performing additional operations with respect to the order. For instance, if the first buyer selects the virtual control 1028, the buyer application may perform operations to view other merchants with whom orders may be placed, rather than the particular merchant. For instance, as mentioned above, if one or more other merchants are offering the same delivery fee and/or if proximity to the first buyer is not a concern, the first buyer may be able to place an order with one of these other merchants.

In another example, if the first buyer selects the virtual control 1030, the buyer application may perform operations to suggest a preferred delivery cost for the next order. For instance, the buyer application may access an interactive interface to provide recommendation on delivery costs on both merchant and item basis.

As another example, the buyer application may send the suggested delivery information to the service computing device. The service computing device may analyze the suggested delivery data received by the first buyer and other buyers in a particular geographical area, and generate a recommendation for the merchant. For example, the service computing device may generate a value of shared-revenue that will be sufficient to expand the merchant's delivery zone and provide them with growth opportunities, for example, without affecting their profit distribution or by providing a customer base that was not available before. The service computing device may also send a communication to other merchant devices either within a threshold distance of the delivery location to increase the shared-revenue to show an increased interest in online food orders or show increased interest in merchants offering items similar to merchant 1012, but who have a delivery fee higher than 1020.

In some examples, both the buyer application and the service computing device may attempt to locate potential merchants to participate in registering with the service by increasing their current shared-revenue to the level of the current merchant. Thus, the buyer application on the buyer device 132(1) may attempt to locate nearby buyer devices using short range communications and geo-fence techniques, while the service computing device may also attempt to locate other nearby buyer devices within a threshold distance of the delivery location based on location information received from the other buyer devices, or past history of buyers who have placed orders from the delivery location specified by the first buyer. In some cases, buyers may not want their locations to be tracked by the service computing device. Accordingly, if the service computing device does not know the current location of a particular buyer device, the service computing device may send an inquiry to the particular buyer device only if the particular buyer has ordered from a particular delivery location multiple times in the past and at a time of day that is near to the current time of day.

The service computing device can send the shared-revenue recommendations to merchants in the form of alerts, text notification, emails, or phone calls. The recommendations may be in the form of a slider to help a merchant choose a shared-revenue that yields a specific delivery cost. Of course, the slider is one way of representing information. The information can be represented in several other ways including, but not limited to, graphs, plots, charts, etc.

In addition, the GUI 1000 may present a second virtual control 1030, which the buyer may select to specify a delivery fee, especially if the delivery fee changes in real-time. The first buyer may choose to wait for the lowest delivery fee of the day if timing of the order is of no concern. For example, the buyer may choose that the order be delivered when the delivery is free. The buyer application sends the request along with the order information to the service computing device. The service computing device collects all such requests and sends to the merchant which can temporarily increase the shared-revenue based on the volume of requests, to defray the delivery costs.

In addition, the GUI 1000 may present a third virtual control 1032, which the buyer may select to add a comment for this merchant to offer bulk or repeat orders, which may encourage the merchant to review the shared-revenue and thus, the delivery fee.

Additionally, the GUI 1000 may present a fourth virtual control 1034, which the buyer may select to place the first order immediately, rather than attempting to wait for a lower delivery fee, as described above.

Figure 11:
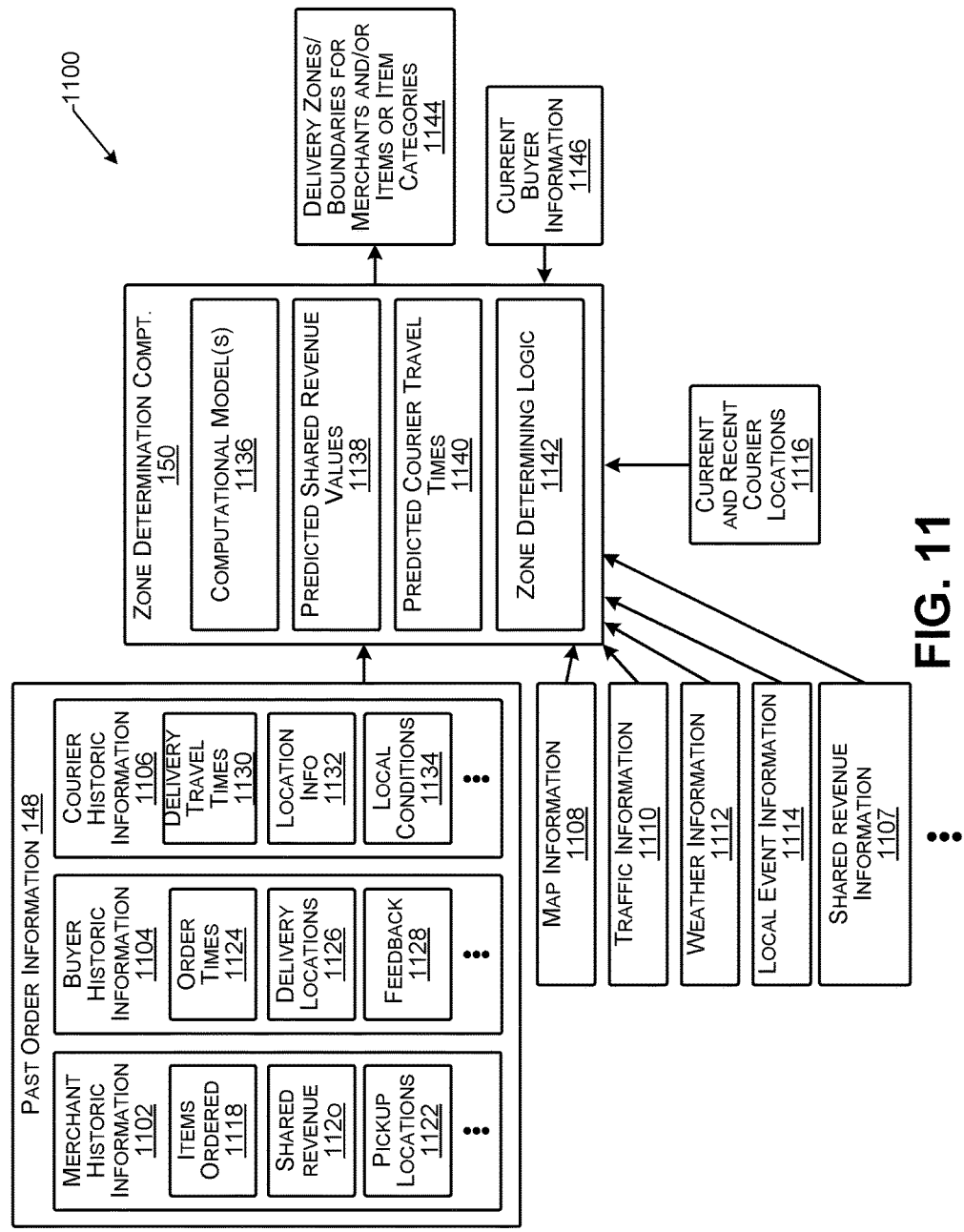
FIG. 11 is a block diagram illustrating an example framework for selecting a specific shared-revenue value to determine delivery zones according to some implementations.

FIG. 11 is a conceptual block diagram 1100 illustrating an example of determining information that may be used for determining fluid delivery zones according to some implementations. In one implementation, the shared-revenue value between the merchant and the service provider 104 is fixed. However, in other implementations, the shared-revenue value can be varied as other parameters, such as demand for an item, traffic conditions, etc., changes. Accordingly, the service provider 104 may use a portion of the increased shared revenue value to deliver items to previously excluded and/or distant buyers. The embodiments described herein disclose systems and methods in which the shared-revenue may be adjusted as per varying conditions and as a result, manner in which the zones may be expanded in and out without conforming to a particular shape.

In this example, the zone determination component 150 may receive the past order information 148 including merchant historic information 1102, buyer historic information 1104, and courier historic information 1106. In addition, the zone determination component 150 may receive past shared-revenue data between couriers and different merchants 1107, map information 1108, traffic information 1110, weather information 1112, local event information 1114, and/or current and recent courier location information 1116. Further, while several types of information that may be used by the zone determination component 150 are illustrated, in other examples, other or additional types of information may be used by the zone determination component 150, as discussed above, and/or as will be apparent to those of skill in the art having the benefit of the disclosure herein.

The merchant-courier revenue data 1107 includes historic shared revenue data between the merchants and the service computing device 102. The merchant historic information 1102 includes historic order information related to the merchants, e.g., various types of information related to past orders filled by the merchants that participate in the service of the service provider 104. For instance, the merchant historic information 1102 may include items ordered 1118 from each merchant at particular times on particular days of the week, particular dates, and the like. Further, the merchant historic information 1102 may include the delivery preferences 1120 (such as spoilage time, a delivery price, tax, or the like) for each item offered by each merchant and the pickup locations 1122 associated with each merchant. As one example, each merchant may specify a different shared-revenue value for each item or each category of item offered by the merchant. In some cases, the merchants may categorize items into shared-revenue-based item categories unbeknownst to the buyers and/or couriers, such that items having a similar shared revenue value categorized into the same item category. In other examples, the service provider may determine item shared-revenue values and/or item categories based on empirical information, which may include buyer and/or courier feedback, as discussed additionally below.

Additionally, the buyer historic information 1104 includes historic order information related to the buyers. Examples of buyer historic information 1104 may include order times 1124, e.g., a time of day, day of the week, and date on which each order was placed. The buyer historic information 704 may further include delivery locations 1126 to which each order was delivered, and spoilage feedback 1128. For instance, as discussed additionally below, feedback may be received from the buyer devices (and/or from the courier devices) that may indicate if one or more items from an order spoiled prior to delivery to the buyer. This feedback may be used to adjust or otherwise change the delivery route for particular items or categories of items offered by particular merchants. Also, the feedback may help the merchant to increase the delivery charges to accommodate for a more sophisticated means for delivery of the item or items to the buyer outside of the normal delivery zone but now included in the fluid delivery zone.

Further, the courier historic information 1106 includes historic order information related to the couriers. For example, the courier historic information 1106 may include delivery travel times 1130, which may indicate the time that an order was picked up and the time that the order was delivered, e.g., how long it took each courier to deliver each order after picking up the order from the merchant's pickup location. Additionally, location information 1132 may include locations of individual couriers at different times of day, for different days of the week in different parts of the service region. For instance, the courier location information 1132 may indicate speeds at which couriers are able to travel on different streets in the service region at different times of day, thereby providing an indication of traffic information and an indication of predicted delivery travel times at different times of day and different days of the week. The location information 1132 may further indicate the delivery route and how far each courier had to travel after picking up each order to make delivery of the order.

In addition, the courier historic information 1106 may include local conditions 1134, such as traffic conditions and weather conditions when particular orders were fulfilled, information regarding any local events taking place within the service region when the orders were fulfilled, and the like. Furthermore, the merchant historic information 1102, the buyer historic information 1104, and the courier historic information 1106 may include additional types of information, with the foregoing being merely several examples of the types of information that may be used by the zone determination component 150.

In some implementations, the zone determination component 150 may employ one or more computational models 1136 for determining predicted shared revenue values 1138 for all or various different items offered by various different merchants. A shared-revenue value may be the percentage of profits or cost of the item withheld by the service provider 104 or shared by the service provider 104 with the merchant. The shared revenue value may be for each order, each item or a group of orders. The shared revenue is computed and settled at finalization of the order, processing of the order, processing of several orders at the end of a day, or processing of several orders from certain merchants, and so on.

The zone determination component 150 may determine the predicted shared revenue value 1138 of various different items based in part on the actual or preferred shared revenue values 1120 indicated by the merchants, and/or further based in part on the general values for merchants in the service region over an upcoming period of time, or merchants offering certain types of items. For instance, the merchants offering Mexican food for delivery may all be associated with a specific shared-revenue value while other restaurants offering Italian cuisine may be associated with another shared-revenue value. Accordingly, the shared revenue values 1120 provided by the merchants may provide a baseline for the computational model 1136.

Further, the local weather may have an effect on shared-revenue values, such as on unusually hot days, unusually cold days, rainy days, and the like, that may not have been taken into consideration by the merchants when estimating spoilage times for their items, which further affects the delivery arrangements to buyers further away. For example, on a very hot day, items that are served hot may have an extended spoilage time, while items that are served cold, may have a decreased spoilage time, and vice versa on unusually cold days. As another example, rainy days and very humid days may decrease the spoilage time for certain items such as items that are expected to be crisp or crunchy. Thus, in one example, other factors may yield a value that causes the boundaries to expand, however, weather conditions may allow expansion only to a certain extent. Accordingly, the weather information 1112 may be obtained from an online source or other suitable source, and may be used when determining the predicted shared-revenue values 1138.

Shared-revenue feedback 1128 from the buyers and/or from the couriers to determine the number of buyers profiting from the delivery zone expansion. The couriers can provide feedback to indicate interest in delivery in certain excluded regions at certain times of the day, for example the excluded region may be in the area where the courier takes a lunch break. For instance, suppose that a particular item, such as French fries from The Gourmet Burger Restaurant discussed above, have been delivered to a large number of buyers within the service region. One of this buyer may be at a friend's place within the delivery zone, however, may wish to have the fries delivered at his home which is not currently in the delivery zone. As one example, the buyer application on the buyer device may provide the buyer with the opportunity to provide feedback to indicate interest in the fries and request for delivery at the new location. The merchant, after receiving several such feedback, may choose to increase the shared-revenue value to defray the delivery costs for the buyers in the excluded delivery zone, inherently expanding the original delivery zone to a new delivery zone that includes buyers that submitted the feedback. The feedback may be transmitted automatically by the buyer application to the service computing device.

The service computing device may apply parsing and text recognition for determining, from particular orders, the items to which the negative feedback applies. For instance, words such as "high delivery fee", "unavailable", etc., when included in the same comment as "fries" may indicate an interest in French fries. Additionally, the buyer may also send location information so that the merchant can configure the delivery zone. Consequently, when a threshold level of feedback has been received for an item or a category of items from a particular merchant, the delivery boundaries for the item or items may be adjusted temporarily or permanently. As another example, if no feedback is received for particular items or particular categories of items from a particular merchant, the delivery boundaries stay as-is.

As still another example, the couriers may also provide feedback for individual orders, such as regarding availability or demand of certain items or the like. Accordingly, the courier application on the courier device may provide the couriers with one or more GUIs (not shown in FIG. 11) to enable the couriers to provide feedback regarding delivery availability, traffic conditions while delivering to a distant location, quality of items on delivery to a distant location. Furthermore, in some examples the couriers may be provided with an incentive to provide the feedback, such as for additional compensation, points towards courier benefits, rewards, prizes, or other types of incentives.

Additionally, in some cases, the items offered by each merchant may be categorized into respective item categories based in part on the predicted shared-revenue data 1138. The use of item categories may simplify the merchant and item information that is provided to the buyer device. As an example, such item categories may be determined according to a 5-minute, 10-minute, 15-minute granularity, or any other suitable granularity. For instance, a first item category may be for hot items that are predicted to spoil within 15 minutes of preparation, a second category may be for hot items predicted to spoil within 25 minutes of preparation, a third item category may be for cold items that are predicted to spoil within 45 minutes of preparation, and so forth. Accordingly, the merchant may choose to apply shared-revenue towards cold items only, in one implementation, to avoid spoilage of items during delivery to locations beyond a certain distance from the merchant.

Furthermore, in some examples, the zone determination component 150 may employ the one or more computational models 1136 for determining predicted courier travel times 1140 between merchant pickup locations and potential delivery locations and/or a particular delivery location specified by a buyer, such as for a particular day during a particular delivery time interval. The predicted courier travel times 1138 may be based in part on the courier historic information 1106, such as based on courier location information 1132 that indicates courier movement within the service region at particular times, on particular days, on particular dates, during particular types of weather, or while other local conditions 1134 are in effect.

The predicted courier travel times may further be based at least in part on current or future information, such as weather forecast information 1112, and local event information 1114. As one example, based at least in part on the one or more computational models 1136, the zone determination component 150 may determine a confidence score for a prediction of how long it will take a courier to travel from a first point to a second point within the service region at a particular time on a particular day of the week. The current and recent courier location information 1116 may also be considered when determining the predicted courier travel times 1140. For example, recent courier movement, or lack thereof, may indicate unexpectedly heavy traffic. Additionally, in some examples, traffic information 1110 from an online map service, such as may be obtained from a webserver or other network source, may also be used or taken into consideration by the computational model when determining the predicted courier travel times.

As one example, the computational model(s) 1136 may include one or more trained statistical models that account for numerous pieces of information included in the past order information 148, as well as current information, such as time, day and date information, traffic information 1110, weather information 1112, local event information 1114, and the like. In some cases, the one or more statistical models may be initially trained using a set of training data, checked for accuracy, spoilage items, and then used for predicting at least one of shared revenue, delivery fee, or courier travel times based on a confidence score exceeding a specified threshold of confidence. The statistical model(s) may be periodically updated and re-trained based on new training data to keep the model(s) up to date and accurate. Examples of suitable statistical models that may be incorporated into the computational model(s) 1136 herein may include regression models, such as linear and nonlinear regression models, and stochastic models, such as Markov models, hidden Markov models, and so forth.

Additionally, while the computational model 1136 has been described as one example of a technique for predicting shared revenue and delivery fee 1138 and/or predicted courier travel times 1140, numerous other techniques, algorithms, decision-making rules, and the like, may additionally or alternatively be used for determining this information. Accordingly, implementations herein are not limited to use of a computational model 1136.

After the zone determination component 150 has determined, for an upcoming period of time, predicted shared-revenue values 1138 and/or predicted courier travel times 1140, the zone determination component 150 may apply zone determining logic 1142 to these predictions, such as to generate delivery zones 1144 for merchants and/or for items or categories of items offered by the merchants, such as for particular times and days. In some instances, the zone determining logic 1142 may also receive the current buyer information 1146, such as an indicated delivery location and/or an indicated desired delivery time, and may determine the delivery zones 1144 based on this information as discussed above with respect to FIGS. 1-7.

In some examples, the zone determining logic 1142 may include one or more algorithms, one or more computational models, a plurality of decision-making rules, or the like, configured to determine delivery zones based on the predicted shared-revenue values 1138 and/or the predicted courier travel times 1140. For instance, the zone determining logic 1142 may employ the various different considerations discussed above to determine the delivery zones based on the predicted courier travel times 1140 from a particular merchant pickup location to potential delivery locations being less than the predicted spoilage times for particular items or categories of items. The predicted courier travel time may be determined based on map information, current or predicted traffic conditions, as well as weather conditions, local events, street closures, construction projects, and so forth. Thus, the delivery zone of a particular merchant and particular items offered by the merchant may expand and contract with changes in traffic conditions, weather, and/or other local conditions. For example, a particular merchant or item may have a large delivery zone when traffic is light, but the delivery zone may shrink substantially during rush hour.

In some cases, the delivery zones for respective merchants and/or items may be calculated in advance, such as based on the existing shared-revenue values. For instance, each delivery zone may be determined based on a radius, oval, or other form or shape around a pickup location of a respective merchant based on predicted courier travel times to the perimeter of the delivery zone. If the spoilage time for a particular item or category of items is 25 minutes, then the perimeter of the delivery zone may generally be 25 minutes of predicted courier travel time in every direction from the pickup location of the merchant. In some cases, each delivery zone may be determined more precisely as a respective polygon or partial polygon around each pickup location, such as with the outer edges of the polygon being aligned with individual streets at the perimeter of the respective delivery zone. In other cases, the delivery zone may not conform to any shape and is based on inclusion of certain buyers irrespective of where they are located.

In addition, in some cases, the respective delivery zones may be determined based at least in part on a cost function that takes into account tolls, actual feedback, and predicted courier travel time. Thus, the zone determining logic 1142 may determine the boundary of the delivery zone at a plurality of points at which the cost of delivery becomes prohibitive. For instance, a particular delivery zone may be determined based on a probability of spoilage based in part on the feedback 1128, e.g., if there is a 90 percent or greater probability that an item can be delivered to a location at a particular time without spoilage, then the location may be included in the delivery zone for that item. This determination can be refined based on the feedback 1128 from the buyers and/or the couriers. Furthermore, the cost function may treat a toll as another cost of the order, which would tend to make a delivery requiring payment of a toll less likely as the cost of the toll increases relative to the cost of the order. Additionally, or alternatively, tolls or geological features, such as bodies of water without nearby bridges, may be taken into consideration, and may result in hard cutoffs that would exclude delivery across the tolls or across other geological features that might not be easily traversed.

In some examples, the service provider may receive, from a courier device, an indication of a time when the courier picks up an order from a pickup location and a time at which the courier delivers the order to the delivery location. The service may adjust the delivery zones and/or the computational model 1136 and/or the zone determining logic 1142 for determining the delivery zones based on the location information and other feedback received from the courier devices over a period of time. For example, if the actual courier travel time is different from that predicted by the computational model 1136, the computational model 1136 may be modified to predict courier travel times more accurately. As another example, if delivery to a particular address typically requires an additional 5-10 minutes between when the courier arrives at the location and when the courier indicates that the delivery is complete, the address may correspond to a high rise building, or the like, and the additional delivery time required may be taken into consideration in the future when determining whether the particular building is included in a particular delivery zone.

Additionally, in some implementations, the determination of respective delivery zones 1144 may be performed by the buyer application on the buyer device, rather than on the service computing device of the service provider. For example, the buyer application on the buyer device may keep track of the location of the buyer device using an onboard GPS receiver or other location sensor. The buyer application may periodically update the item delivery zones and/or merchant delivery zones based on received information, such as traffic information or weather information. For example, the buyer application on the buyer device include at least a portion of the zone determination component 150 and may determine at least one of predicted courier travel times 1140, predicted delivery time 1136, and/or delivery zones 1144, based on information received from the service computing device and other sources of information.

Furthermore, the delivery zones 1144 may change day-to-day and week-to-week based on current weather conditions, local events, seasonal traffic patterns, and the like. As one example, the zone determination component 150 may use weather forecasts and other weather information 112, at least in part, to determine delivery zones for upcoming days for which weather forecasts are available. Similarly, local event information 1114 about local events that may cause street closures or may otherwise affect the traffic in the service region can also be taken into consideration when predicting courier travel times used for determining the delivery zones.

In some examples, the courier application may automatically send courier location information 1116 to the zone determination component on a periodic basis while the associated courier is on-duty or otherwise active. Alternatively, the zone determination component 150 may periodically ping the courier devices of active couriers to determine the couriers' current locations. Each courier device may include one or more location sensors, such as a GPS receiver, or communication interfaces that can determine (e.g., from cell towers or wireless access points) a geographic location of the courier device.

In some cases, the zone determination component generates an interactive slider allowing the merchant to vary the shared-revenue values and determine how the delivery zone varies in real-time. Alternatively, the zone determination component may itself vary the delivery boundaries based on a best-fit shared-revenue value at any point in time, thus constantly including and excluding new buyers. Further, even though the description above focuses on expansion to include new buyers that were previously excluded, it will be understood that by applying a similar logic, the methods and systems can exclude buyers that were previously included but should not be excluded based on updated shared-revenue/profit models.

Figure 12:
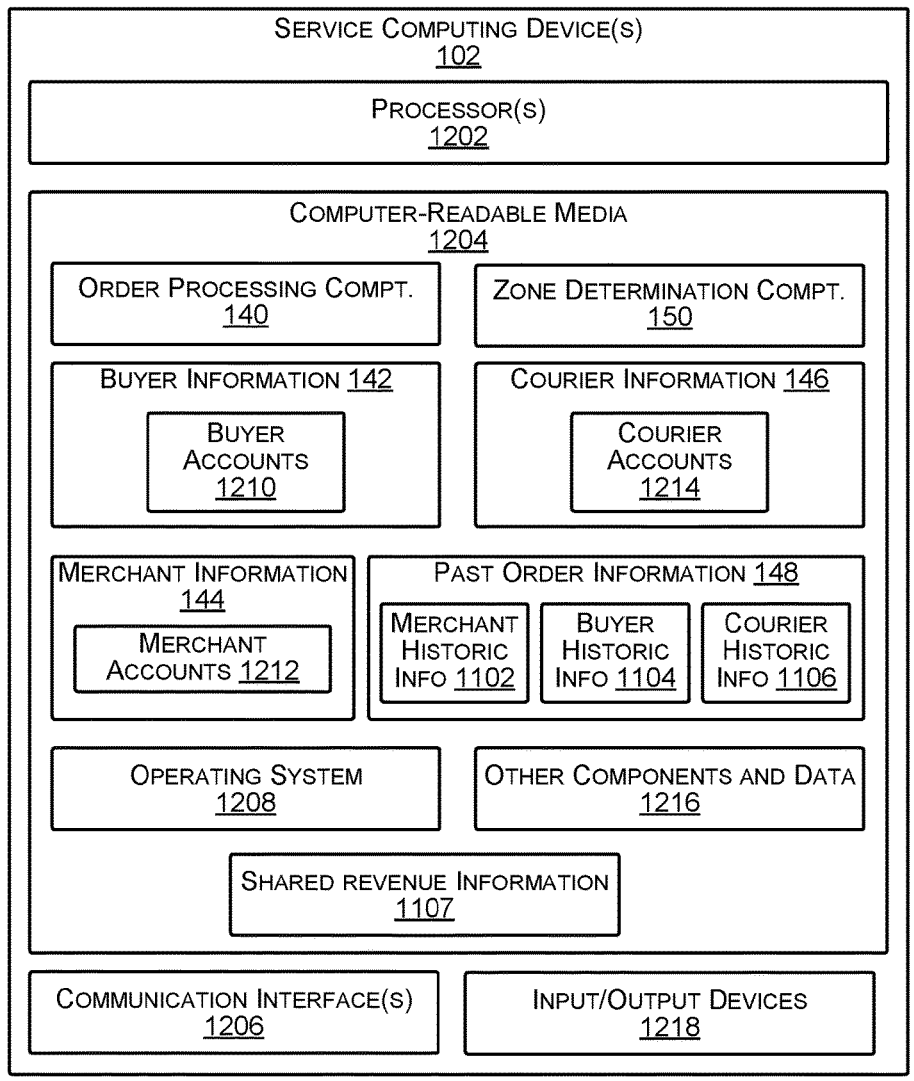
FIG. 12 illustrates select components of one or more example service computing devices according to some implementations.

FIG. 12 illustrates select components of the service computing device 102 that may be used to implement some functionality of the fluid delivery zones and order processing services described herein. The service computing device 102 may include one or more servers or other types of computing devices that may be embodied in any number of ways. For instance, in the case of a server, the components, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionalities described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 102 may include one or more processors 1202, one or more computer-readable media 1204, and one or more communication interfaces 1206. Each processor 1202 may be a single processing unit or a number of processing units, and may include single or multiple computing units or multiple processing cores. The processor(s) 1202 can be implemented as one or more microprocessors, microcomputers, microcontrollers, digital signal processors, central processing units, state machines, logic circuitries, and/or any devices that manipulate signals based on operational instructions. For instance, the processor(s) 1202 may be one or more hardware processors and/or logic circuits of any suitable type specifically programmed or configured to execute the algorithms and processes described herein. The processor(s) 1202 can be configured to fetch and execute computer-readable instructions stored in the computer-readable media 1204, which can program the processor(s) 1002 to perform the functions described herein.

The computer-readable media 1204 may include volatile and nonvolatile memory and/or removable and non-removable media implemented in any type of technology for storage of information, such as computer-readable instructions, data structures, program components, or other data. Such computer-readable media 1204 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 1204 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1204 may be used to store any number of functional components that are executable by the processors 1202. In many implementations, these functional components comprise instructions or programs that are executable by the processors 1202 and that, when executed, specifically configure the one or more processors 1202 to perform the actions attributed above to the service computing device 102. Functional components stored in the computer-readable media 1204 may include the order processing component 140 and the zone determination component 150. The zone determination component 150 may also store past and current shared-revenue values between the merchants and the service provider 104. Additional functional components stored in the computer-readable media 1004 may include an operating system 1208 for controlling and managing various functions of the service computing device 102.

In addition, the computer-readable media 1204 may store data used for performing the operations described herein. Thus, the computer-readable media 1204 may store the buyer information 142, including buyer accounts 1210, the merchant information 144, including merchant accounts 1212, and the courier information 146, including courier accounts 1214. Further, the computer-readable media may include the past order information 146, such as the merchant historic information 1102, the buyer historic information 1104, and the courier historic information 1106, and the shared-revenue data 1107. The service computing device 102 may also include or maintain other functional components and data not specifically shown in FIG. 12, such as other components and data 1216, which may include programs, drivers, etc., and the data used or generated by the functional components. Further, the service computing device 102 may include many other logical, programmatic and physical components, of which those described above are merely examples that are related to the discussion herein.

The communication interface(s) 1206 may include one or more interfaces and hardware components for enabling communication with various other devices, such as over the network(s) 106. For example, communication interface(s) 1206 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The service computing device 102 may further be equipped with various input/output (I/O) devices 1218. Such I/O devices 1218 may include a display, various user interface controls (e.g., buttons, joystick, keyboard, mouse, touch screen, etc.), audio speakers, connection ports and so forth.

Figure 13:
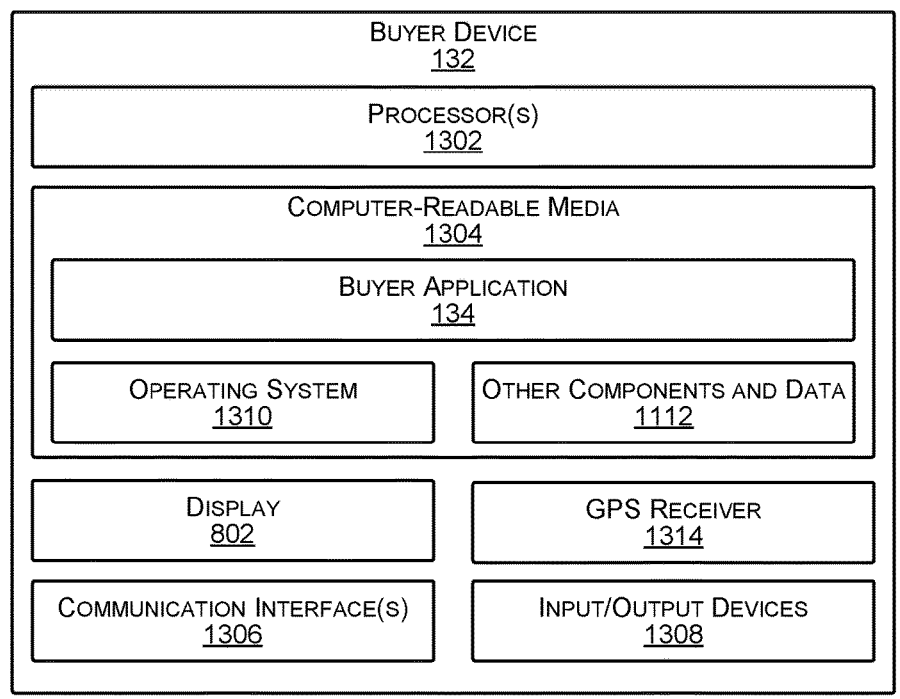
FIG. 13 illustrates select components of an example buyer device according to some implementations.

FIG. 13 illustrates select example components of the buyer device 132 that may implement the functionality described above according to some examples. The buyer device 132 may be any of a number of different types of portable computing devices. Some examples of the buyer device 132 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein. Further, in some examples, the buyer device 132 may be a stationary or semi-stationary computing device, such as a desktop computer or other device with computing capabilities. Furthermore, the merchant device 128 may include hardware structures and components similar to those described for the buyer device 132, but with one or more different functional components.

In the example of FIG. 13, the buyer device 132 includes components such as at least one processor 1302, one or more computer-readable media 1304, one or more communication interfaces 1306, and one or more input/output (I/O) devices 1308. Each processor 1302 may itself comprise one or more processors or processing cores. For example, the processor 1302 can be implemented as one or more microprocessors, microcomputers, microcontrollers, digital signal processors, central processing units, state machines, logic circuitries, and/or any devices that manipulate signals based on operational instructions. In some cases, the processor 1302 may be one or more hardware processors and/or logic circuits of any suitable type specifically programmed or configured to execute the algorithms and processes described herein. The processor 1302 can be configured to fetch and execute computer-readable processor-executable instructions stored in the computer-readable media 1304.

Depending on the configuration of the buyer device 132, the computer-readable media 1304 may be an example of tangible non-transitory computer storage media and may include volatile and nonvolatile memory and/or removable and non-removable media implemented in any type of technology for storage of information such as computer-readable processor-executable instructions, data structures, program components or other data. The computer-readable media 1304 may include, but is not limited to, RAM, ROM, EEPROM, flash memory, solid-state storage, magnetic disk storage, optical storage, and/or other computer-readable media technology. Further, in some cases, the buyer device 132 may access external storage, such as RAID storage systems, storage arrays, network attached storage, storage area networks, cloud storage, or any other medium that can be used to store information and that can be accessed by the processor 1302 directly or through another computing device or network. Accordingly, the computer-readable media 1304 may be computer storage media able to store instructions, components, or components that may be executed by the processor 1302. Further, when mentioned, non-transitory computer-readable media exclude media such as energy, carrier signals, electromagnetic waves, and signals per se.

The computer-readable media 1304 may be used to store and maintain any number of functional components that are executable by the processor 1302. In some implementations, these functional components comprise instructions or programs that are executable by the processor 1302 and that, when executed, implement operational logic for performing the actions and services attributed above to the buyer device 132. Functional components of the buyer device 132 stored in the computer-readable media 1304 may include the buyer application 134, as discussed above, which may present the buyer with one or more GUIs for placing an order, some examples of which are described above. Additional functional components may include an operating system 1310 for controlling and managing various functions of the buyer device 132 and for enabling basic user interactions with the buyer device 132.

In addition, the computer-readable media 1104 may also store data, data structures and the like, that are used by the functional components. Depending on the type of the buyer device 132, the computer-readable media 1104 may also optionally include other functional components and data, such as other components and data 1312, which may include applications, programs, drivers, etc., and the data used or generated by the functional components. Further, the buyer device 132 may include many other logical, programmatic and physical components, of which those described are merely examples that are related to the discussion herein.

The communication interface(s) 1306 may include one or more interfaces and hardware components for enabling communication with various other devices, such as over the network(s) 106 or directly. For example, communication interface(s) 1306 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 13 further illustrates that the buyer device 132 may include the display 802. Depending on the type of computing device used as the buyer device 132, the display 802 may employ any suitable display technology. For example, the display 802 may be a liquid crystal display, a plasma display, a light emitting diode display, an OLED (organic light-emitting diode) display, an electronic paper display, or any other suitable type of display able to present digital content thereon. In some examples, the display 802 may have a touch sensor associated with the display 802 to provide a touchscreen display configured to receive touch inputs for enabling interaction with a GUI presented on the display 802. Accordingly, implementations herein are not limited to any particular display technology. Alternatively, in some examples, the buyer device 132 may not include a display.

The buyer device 132 may further include the one or more I/O devices 1308. The I/O devices 1308 may include speakers, a microphone, a camera, and various user controls (e.g., buttons, a joystick, a keyboard, a keypad, etc.), a haptic output device, and so forth. Other components included in the buyer device 132 may include various types of sensors, which may include a GPS receiver 1314 able to indicate location information, as well as other sensors (not shown) such as an accelerometer, gyroscope, compass, proximity sensor, and the like. In some cases, the GPS receiver 1314 may be used by the buyer application 134 to determine a current geographic location of the buyer device 132. Additionally, or alternatively, the communication interfaces 1306 may be used to determine the current location of the buyer device 132, such as based on communication with nearby cell towers, wireless access points, and the like. In some examples, the buyer application 134 may send this location information to the service computing device as an indicated delivery location for the associated buyer. Additionally, the buyer device 132 may include various other components that are not shown, examples of which include removable storage, a power source, such as a battery and power control unit, and so forth.

Figure 14:
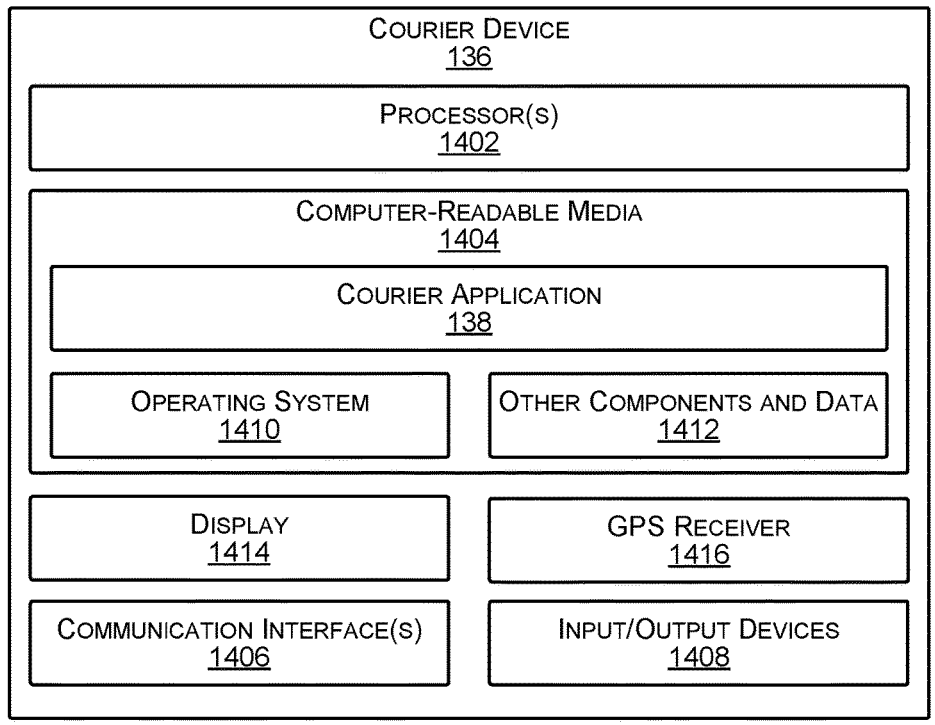
FIG. 14 illustrates select components of an example courier device according to some implementations.

FIG. 14 illustrates select example components of the courier device 136 that may implement the functionality described above according to some examples. The courier device 136 may be any of a number of different types of portable computing devices. Some examples of the courier device 136 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 14, the courier device 136 includes components such as at least one processor 1402, one or more computer-readable media 1404, one or more communication interfaces 1406, and one or more input/output (I/O) devices 1408. Each processor 1402 may itself comprise one or more processors or processing cores. For example, the processor 1402 can be implemented as one or more microprocessors, microcomputers, microcontrollers, digital signal processors, central processing units, state machines, logic circuitries, and/or any devices that manipulate signals based on operational instructions. In some cases, the processor 1402 may be one or more hardware processors and/or logic circuits of any suitable type specifically programmed or configured to execute the algorithms and processes described herein. The processor 1202 can be configured to fetch and execute computer-readable processor-executable instructions stored in the computer-readable media 1404.

Depending on the configuration of the courier device 136, the computer-readable media 1404 may be an example of tangible non-transitory computer storage media and may include volatile and nonvolatile memory and/or removable and non-removable media implemented in any type of technology for storage of information such as computer-readable processor-executable instructions, data structures, program components, or other data. The computer-readable media 1404 may include, but is not limited to, RAM, ROM, EEPROM, flash memory, solid-state storage, magnetic disk storage, optical storage, and/or other computer-readable media technology. Further, in some cases, the courier device 136 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1404 may be computer storage media able to store instructions, components, or components that may be executed by the processor 1402. Further, when mentioned, non-transitory computer-readable media exclude media such as energy, carrier signals, electromagnetic waves, and signals per se.

The computer-readable media 1404 may be used to store and maintain any number of functional components that are executable by the processor 1402. In some implementations, these functional components comprise instructions or programs that are executable by the processor 1402 and that, when executed, implement operational logic for performing the actions and services attributed above to the courier device 136. Functional components of the courier device 136 stored in the computer-readable media 1404 may include the courier application 138, as discussed above, which may present the courier with one or more GUIs, some examples of which are described above. Additional functional components may include an operating system 1410 for controlling and managing various functions of the courier device 136 and for enabling basic user interactions with the courier device 136.

In addition, the computer-readable media 1404 may also store data, data structures and the like, that are used by the functional components. Depending on the type of the courier device 136, the computer-readable media 1404 may also optionally include other functional components and data, such as other components and data 1412, which may include applications, programs, drivers, etc., and the data used or generated by the functional components. Further, the courier device 136 may include many other logical, programmatic, and physical components, of which those described are merely examples that are related to the discussion herein.

The communication interface(s) 1406 may include one or more interfaces and hardware components for enabling communication with various other devices, such as over the network(s) 126 or directly. For example, communication interface(s) 1406 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 14 further illustrates that the courier device 136 may include a display 1420, which may be the any of the types of displays 502 described above with respect to the buyer device 132. The courier device 136 may further include the one or more I/O devices 1408. The I/O devices 1208 may include speakers, a microphone, a camera, and various user controls (e.g., buttons, a joystick, a keyboard, a keypad, etc.), a haptic output device, and so forth. Other components included in the courier device 136 may include various types of sensors, which may include a GPS receiver 1216 able to indicate location information, as well as other sensors (not shown) such as an accelerometer, gyroscope, compass, proximity sensor, and the like. In some cases, the GPS receiver 1416 may be used by the courier application 138 to determine a current geographic location of the courier device 136. Additionally, or alternatively, the communication interfaces 1406 may be used to determine the current location of the courier device, such as based on communication with nearby cell towers, wireless access points, and the like. In some examples, the courier application 138 may send this location information periodically to the service computing device as an indicated location of the associated courier. Additionally, the courier device 136 may include various other components that are not shown, examples of which include removable storage, a power source, such as a battery and power control unit, and so forth.

Various instructions, methods, and techniques described herein may be considered in the general context of computer-executable instructions, such as program components stored on computer-readable media, and executed by the processor(s) herein. Generally, program components include routines, programs, objects, components, data structures, etc., for performing particular tasks or implementing particular abstract data types. These program components, and the like, may be executed as native code or may be downloaded and executed, such as in a virtual machine or other just-in-time compilation execution environment. Typically, the functionality of the program components may be combined or distributed as desired in various implementations. An implementation of these components and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
 receiving, by a computing device, from an application executing on a buyer device, an electronic communication indicating that the application has been accessed on the buyer device;
 receiving, by the computing device, from the application on the buyer device, an indicated delivery location to which to deliver one or more items;
 determining, by the computing device, respective delivery boundaries associated with a plurality of merchants, each respective delivery boundary being associated with a respective merchant pickup location and encompassing the indicated delivery location, wherein each respective delivery boundary is associated with a delivery fee for at least one item offered by each respective merchant based at least on the indicated delivery location;
 if a value of revenue shared between a first merchant and a service provider associated with the computing device is more than a predefined value, apportioning, by the computing device, at least a part of the value of revenue shared toward modifying the delivery boundary for the first merchant, wherein the modified delivery boundary causes at least one of: a modified delivery fee for delivering the at least one item offered by the first merchant, or an inclusion of an additional item to be available from the first merchant for delivery to the indicated delivery location, wherein the additional item was unavailable for the delivery prior to the modifying the delivery boundary;
 determining, by the computing device, a respective sets of items available for delivery to the indicated delivery location from the plurality of merchants associated with the respective delivery boundaries, including the modified delivery boundary, encompassing the indicated delivery location; and
 sending, by the computing device, to the buyer device, item information about the respective sets of items available to be ordered from the plurality of merchants for delivery to the indicated delivery location, the item information causing the application on the buyer device to present the item information in a user interface on the buyer device, the presented item information including at least one of the modified delivery fee or the additional item.

2. The method of claim 1, further comprising:
 receiving, from the application on the buyer device, a request to deliver a selected set of items to the indicated delivery location at the new delivery fee; and
 determining, by the computing device, a delivery route based at least in part on the modified delivery boundary to deliver the selected set of items.

3. The method of claim 2, wherein determining the delivery route further includes determining traffic conditions within the region, based at least in part on:
 receiving, from a plurality of courier devices associated with a plurality of couriers, respective electronic communications indicating respective locations of the courier devices based at least in part on respective geographic locations of the courier devices determined through information from respective courier device GPS receivers;
 based at least in part on the respective locations received over time, tracking movement of the courier devices in the region; and
 determining an indication of the traffic conditions in the region based at least in part on tracking the movement of the courier devices.

4. The method of claim 2, wherein determining the delivery route further includes determining weather conditions within the region, based at least in part on receiving, from a plurality of courier devices associated with a plurality of couriers, respective electronic communications indicating respective weather conditions in locations of the courier devices based at least in part on respective geographic locations of the courier devices determined through information from respective courier device GPS receivers.

5. The method of claim 2, wherein determining the respective delivery boundaries further includes:
   determining respective predicted spoilage times for respective items or categories of items for the one or more items offered by the respective merchants based at least in part on at least one of:
      feedback received from a plurality of buyer devices associated with a plurality of different buyers regarding the one or more items delivered to the buyers in the past;
      feedback received from a plurality of courier devices associated with a plurality of different couriers who have delivered the one or more items to buyers; or
      predicted weather conditions for the region;
   determining predicted courier travel times indicating how far a courier is predicted to be able to travel in multiple directions from the respective merchant pickup locations of the respective merchants in an amount of time corresponding to the respective predicted spoilage times; and
   determining the respective delivery boundaries based on the how far the courier is predicted to be able to travel in the multiple directions from the respective merchant pickup locations.

6. The method of claim 2, further comprising:
   receiving, over a network, at least one of weather information, traffic information, or local event information for regions within the modified delivery boundary; and
   determining the delivery route based at least in part on the at least one of the weather information, the traffic information, or the local event information.

7. The method of claim 1, further comprising:
   receiving, from the buyer device, the indicated delivery location based at least in part on a geographic location of the buyer device determined through information from a GPS receiver included in the buyer device.

8. The method of claim 1, wherein the value of revenue shared is based at least on a factor computed based on a parameter selected from a group of: traffic conditions; local event conditions; weather conditions; spoilage times of the one or more items; and past values of revenue shared.

9. The method of claim 1, further comprising:
   receiving from a plurality of courier devices, respective location information based at least in part on respective geographic locations of the courier devices determined from respective courier device GPS receivers;
   determining, at least in part from the received courier device location information, an actual courier travel time for a past order;
   comparing the actual courier travel time with a past predicted courier travel time for the past order to determine a difference between the past predicted courier travel time for the past order and the actual courier travel time;
   determining predicted courier travel times based at least in part on the difference between the actual courier travel time and the past predicted courier travel time for the past order; and
   adjust the value of revenue shared based at least in part on the predicted courier travel times.

10. The method of claim 9, further comprising:
    receiving, from one or more courier devices associated with one or more respective couriers, feedback indicative of past delivery orders to a delivery location within the modified delivery boundary and that was previously excluded from the delivery boundary; and
    adjusting the value of revenue shared based at least in part on the feedback received from the plurality of courier devices.

11. One or more non-transitory computer-readable media maintaining instructions that, when executed by one or more processors, program the one or more processors to:
    receive, by the one or more processors, from an application executing on a buyer device, an electronic communication indicating that the application has been accessed on the buyer device;
    receive, by the one or more processors, from the application on the buyer device, an indicated delivery location to which to deliver one or more items;
    determine, by the one or more processors, a delivery boundary associated with a merchant, wherein the delivery boundary is associated with a merchant pickup location and encompasses the indicated delivery location, and wherein the delivery boundary is associated with a delivery fee for items offered by the merchant based at least on the indicated delivery location;
    if a value of revenue shared between the merchant and a service provider is more than a predefined value, allocate, by the one or more processors, at least a part of the value of revenue shared toward modifying the delivery boundary, wherein the modified delivery boundary causes at least one of:
       a modified delivery fee for delivering the one or more items, or
       an inclusion of an additional item to be available from the first merchant for delivery to the indicated delivery location, wherein the additional item was unavailable for the delivery prior to the modifying the delivery boundary;
    determine, by the one or more processors, based on the modified delivery boundary, a set of items of the merchant available for delivery to the indicated delivery location; and
    send, by the one or more processors, to the buyer device, item information about the set of items available to be ordered from the merchant within the modified delivery boundary for delivery to the indicated delivery location, the item information causing the application on the buyer device to present the item information in a user interface on the buyer device, the presented item information including at least one of the modified delivery fee or the additional item.

12. The one or more non-transitory computer-readable media of claim 11, wherein the instructions further program the one or more processors to at least one of:
    receive, from the application on the buyer device, a request to deliver a selected set of items to the indicated delivery location at the new delivery fee, and determine, by the one or more processors, a delivery route based at least in part on the modified delivery boundary to deliver the selected set of items; or
    receive, from a plurality of courier devices associated with a plurality of couriers, respective electronic communications indicating respective locations of the courier devices based at least in part on respective geographic locations of the courier devices determined through information from respective courier device GPS receivers, wherein the respective locations are received over time to enable tracking of movement of the courier devices, determine a predicted courier travel time from the merchant pickup location to the delivery location based at least in part on the movement of the courier devices over time, and adjust the value of revenue shared based at least in part on the predicted courier travel time; or receive, from a first courier device associated with a first courier of the plurality of couriers, feedback related to spoilage of at least one of the one or more items, and adjust the value of revenue shared based at least in part on the feedback received from the first courier device.

13. The one or more non-transitory computer-readable media of claim 11, wherein the instructions further program the one or more processors to:

receive, from the application on the buyer device, feedback related to spoilage of at least one of the one or more items; and adjust the value of revenue shared based at least in part on the feedback received from the application on the buyer device.

14. The one or more non-transitory computer-readable media of claim 11, wherein the instructions further program the one or more processors to:

determine, for a first time period, a first predicted courier travel time from the merchant pickup location to the indicated delivery location;

determine a shorter predicted courier travel time for a second time period that is different from the first time period;

determine, based at least in part on the shorter predicted courier travel time, one or more other items offered by the merchant having a spoilage time that is less than the predicted courier travel time and greater than the shorter predicted courier travel time; and send, to the buyer device, additional item information about the one or more other items.

15. The one or more non-transitory computer-readable media of claim 11, wherein the instructions further program the one or more processors to:

determine a delivery route based at least in part on the modified delivery boundary to deliver a selected set of items to the indicated delivery location;

receive at least one of weather information, traffic information, or local event information; and modify the delivery route based at least in part on one of the weather information, the traffic information, or the local event information.

16. The one or more non-transitory computer-readable media of claim 11, wherein the instructions further program the one or more processors to:

modify the value of revenue shared based at least on a parameter selected from a group of: traffic conditions; local event conditions; weather conditions; spoilage times of the one or more items; and past values of revenue shared.

17. A system comprising:

one or more processors;

one of more non-transitory computer-readable media storing instructions that, when executed by the one or more processors, program the one or more processors to perform operations comprising:

receiving, by the one or more processors, from an application executing on a buyer device, an electronic communication indicating that the application has been accessed on the buyer device;

receiving, by the one or more processors, from the application on the buyer device, an indicated delivery location to which to deliver one or more items;

determining, by the one or more processors, a delivery boundary associated with a merchant, wherein the delivery boundary is associated with a merchant pickup location and encompasses the indicated delivery location, and wherein the delivery boundary is associated with a delivery fee for items offered by the merchant based at least on the indicated delivery location;

if a value of revenue shared between the merchant and a service provider is more than a predefined value, allocating, by the one or more processors, at least a part of the value of revenue shared toward modifying the delivery boundary, wherein the modified delivery boundary causes at least one of:

a modified delivery fee for delivering the one or more items, or an inclusion of an additional item to be available from the first merchant for delivery to the indicated delivery location, wherein the additional item was unavailable for the delivery prior to the modifying the delivery boundary;

determining, by the one or more processors, based on the modified delivery boundary, a set of items of the merchant available for delivery to the indicated delivery location; and send, by the one or more processors, to the buyer device, item information about the set of items available to be ordered from the merchant within the modified delivery boundary for delivery to the indicated delivery location, the item information causing the application on the buyer device to present the item information in a user interface on the buyer device, the presented item information including at least one of the modified delivery fee or the additional item.

18. The system as recited in claim 17, the operations further comprising:

receiving, from the application on the buyer device, a request to deliver a selected set of items to the indicated delivery location at the new delivery fee; and determining, by the one or more processors, a delivery route based at least in part on the modified delivery boundary to deliver the selected set of items.

19. The system as recited in claim 17, the operation of determining the delivery boundary further comprising:

determining respective predicted spoilage times for items or categories of items for the one or more items offered by the merchant based at least in part on at least one of:

feedback received from a plurality of buyer devices associated with a plurality of different buyers regarding the one or more items delivered to the buyers in the past;

feedback received from a plurality of courier devices associated with a plurality of different couriers who have delivered the one or more items to buyers; or predicted weather conditions for the region;

determining predicted courier travel times indicating how far a courier is predicted to be able to travel in multiple directions from the merchant pickup location in an amount of time corresponding to the respective predicted spoilage times; and determining the delivery boundary based on the how far the courier is predicted to be able to travel in the multiple directions from the merchant pickup location.

20. The system as recited in claim 17, the operations further comprising:
   receiving, from one or more courier devices associated with one or more respective couriers, feedback indicative of past delivery orders to a delivery location within the modified delivery boundary and that was previously excluded from the delivery boundary; and
   adjusting the value of revenue shared based at least in part on the feedback received from the plurality of courier devices.

\* \* \* \* \*